US009451173B2

(12) United States Patent
Kang et al.

(10) Patent No.: US 9,451,173 B2
(45) Date of Patent: Sep. 20, 2016

(54) ELECTRONIC DEVICE AND CONTROL METHOD OF THE SAME

(71) Applicant: Samsung Electronics Co., Ltd., Suwon-si, Gyeonggi-do (KR)

(72) Inventors: Hwa-Young Kang, Suwon-si (KR); Young-Kwon Yoon, Seoul (KR); Jong-Hyub Lee, Suwon-si (KR); Moon-Soo Kim, Seoul (KR); Tae-Ho Kim, Cheongju-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/450,604

(22) Filed: Aug. 4, 2014

(65) Prior Publication Data

US 2015/0244916 A1 Aug. 27, 2015

(30) Foreign Application Priority Data

Feb. 21, 2014 (KR) ........................ 10-2014-0020912

(51) Int. Cl.
*H04N 5/235* (2006.01)

(52) U.S. Cl.
CPC .......... *H04N 5/2353* (2013.01); *H04N 5/2355* (2013.01)

(58) Field of Classification Search
CPC .............................. H04N 5/353; H04N 5/2353
See application file for complete search history.

(56) References Cited

U.S. PATENT DOCUMENTS

| 2009/0231467 | A1* | 9/2009 | Yamashita ............. G03B 7/091 348/234 |
| 2010/0053346 | A1 | 3/2010 | Mitsunaga |
| 2010/0066858 | A1 | 3/2010 | Asoma |
| 2012/0050557 | A1* | 3/2012 | Atanassov ......... H04N 5/35581 348/222.1 |
| 2012/0262600 | A1* | 10/2012 | Velarde ................ H04N 5/2355 348/223.1 |
| 2012/0281111 | A1 | 11/2012 | Jo et al. |
| 2015/0055007 | A1* | 2/2015 | Takahashi .......... H04N 5/23212 348/333.11 |

FOREIGN PATENT DOCUMENTS

JP  2010-062785 A  3/2010
JP  2010-068386 A  3/2010

\* cited by examiner

*Primary Examiner* — Tuan Ho
(74) *Attorney, Agent, or Firm* — Jefferson IP Law, LLP

(57) ABSTRACT

An electronic device and a method of controlling an operation thereof are provided. The method includes acquiring image data using an image sensor comprising a first plurality of pixels configured to have a first identical exposure time and a second plurality of pixels configured to have a second identical exposure time, wherein the acquiring of the image data includes acquiring the image data using the first plurality of pixels and the second plurality of pixels while the first plurality of pixels have the first identical exposure time that is identical to the second identical exposure time of the second plurality of pixels and controlling the image sensor such that the first plurality of pixels has the first identical exposure time different from the second identical exposure time of the second plurality of pixels, at least partially based on the acquired image data.

29 Claims, 21 Drawing Sheets

☐ LONG EXPOSURE  ☐ SHORT EXPOSURE

Gr, R, and B PIXELS; LONG EXPOSURE PIXELS
r, b, and gb PIXELS; SHORT EXPOSURE PIXELS

ELECTRONIC DEVICE AND CONTROL METHOD OF THE SAME

CROSS-REFERENCE TO RELATED APPLICATION(S)

This application claims the benefit under 35 U.S.C. §119 (a) of a Korean patent application filed on Feb. 21, 2014 in the Korean Intellectual Property Office and assigned Serial number 10-2014-0020912, the entire disclosure of which is hereby incorporated by reference.

TECHNICAL FIELD

The present disclosure relates to an electronic device. More particularly, the present disclosure relates to a method of processing a High Dynamic Range (HDR) image using an electronic device.

BACKGROUND

A dynamic range of an image may be a range for representing luminance levels from a dark region to a bright region of the image, and is defined as a ratio between a brightest pixel value and a darkest pixel value. The dynamic range is adjusted through a control of pixel values for representing brightness, such as luminance, of an image. A technology for enhancing image quality by improving the dynamic range of an image output from an image sensor is called a High Dynamic Range (HDR) scheme.

In the HDR scheme, images having different exposure times are obtained by photographing an identical subject two or more times, and a dynamic range is expanded through composition of the images. At this time, two images having different exposure times may be obtained by differently configuring an amount of exposure or a shutter speed, and an HDR image may be acquired through composition and correction of the images.

The above information is presented as background information only to assist with an understanding of the present disclosure. No determination has been made, and no assertion is made, as to whether any of the above might be applicable as prior art with regard to the present disclosure.

SUMMARY

Since a High Dynamic Range (HDR) image is acquired through the composition and correction of the plurality of images having different exposures, an extended period of time may be needed to capture and compose the plurality of images.

Aspects of the present disclosure are to address at least the above-mentioned problems and/or disadvantages and to provide at least the advantages described below. Accordingly, an aspect of the present disclosure is to provide an electronic sensor for creating an image having a high dynamic range in a dynamic environment and a control method thereof.

Another aspect of the present disclosure is to provide an electronic sensor for processing an image acquired through a combination of long exposure pixels and short exposure pixels in real time and a control method thereof.

Another aspect of the present disclosure is to provide an electronic sensor for creating a high quality image through correction of an over-exposed region and an under-exposed region in real time and a control method thereof.

Another aspect of the present disclosure is to provide an electronic sensor for automatically performing switching between an auto-exposure mode and a high dynamic range mode and a control method thereof.

In accordance with an aspect of the present disclosure, an electronic device is provided. The electronic device includes an image sensor configured to acquire image data from an array of pixels included in the image sensor and at least one processor configured to process the image data, wherein the array of pixels includes a first plurality of pixels configured to have a first identical exposure time and a second plurality of pixels configured to have a second identical exposure time, wherein the first identical exposure time is identical to or different from the second identical exposure time, and wherein the at least one processor is configured to control the image sensor such that the first plurality of pixels are changed from at least one of a state of having an exposure time identical to that of the second plurality of pixels to a state of having an exposure time different from that of the second plurality of pixels, and a state of having an exposure time different from that of the second plurality of pixels to a state of having an exposure time identical to that of the second plurality of pixels, based on at least some of the image data.

In accordance with another aspect of the present disclosure, a method of controlling an operation of an electronic device is provided. The method includes acquiring image data using an image sensor including a first plurality of pixels configured to have a first identical exposure time and a second plurality of pixels configured to have a second identical exposure time, wherein the acquiring of the image data includes acquiring the image data using the first plurality of pixels and the second plurality of pixels while first plurality of pixels have the first identical exposure time that is identical to the second identical exposure time of the second plurality of pixels and controlling the image sensor such that the first plurality of pixels have the first identical exposure time different from the second identical exposure time of the second plurality of pixels, at least partially based on the acquired image data.

In accordance with an aspect of the present disclosure, an electronic device for capturing an image is provided. The electronic device includes an image sensor configured to acquire image data from an array of pixels included in the image sensor, the array of pixels configured to generate the image data using a first plurality of pixels configured to have a first identical exposure time and a second plurality of pixels configured to have a second identical exposure time, the first plurality of pixels and the second plurality of pixels being included in the array of pixels, and at least one processor configured to process the image data, to control the first identical exposure time and the second identical exposure time to be a same time or a different time, and to generate an output image according to the image data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1A:
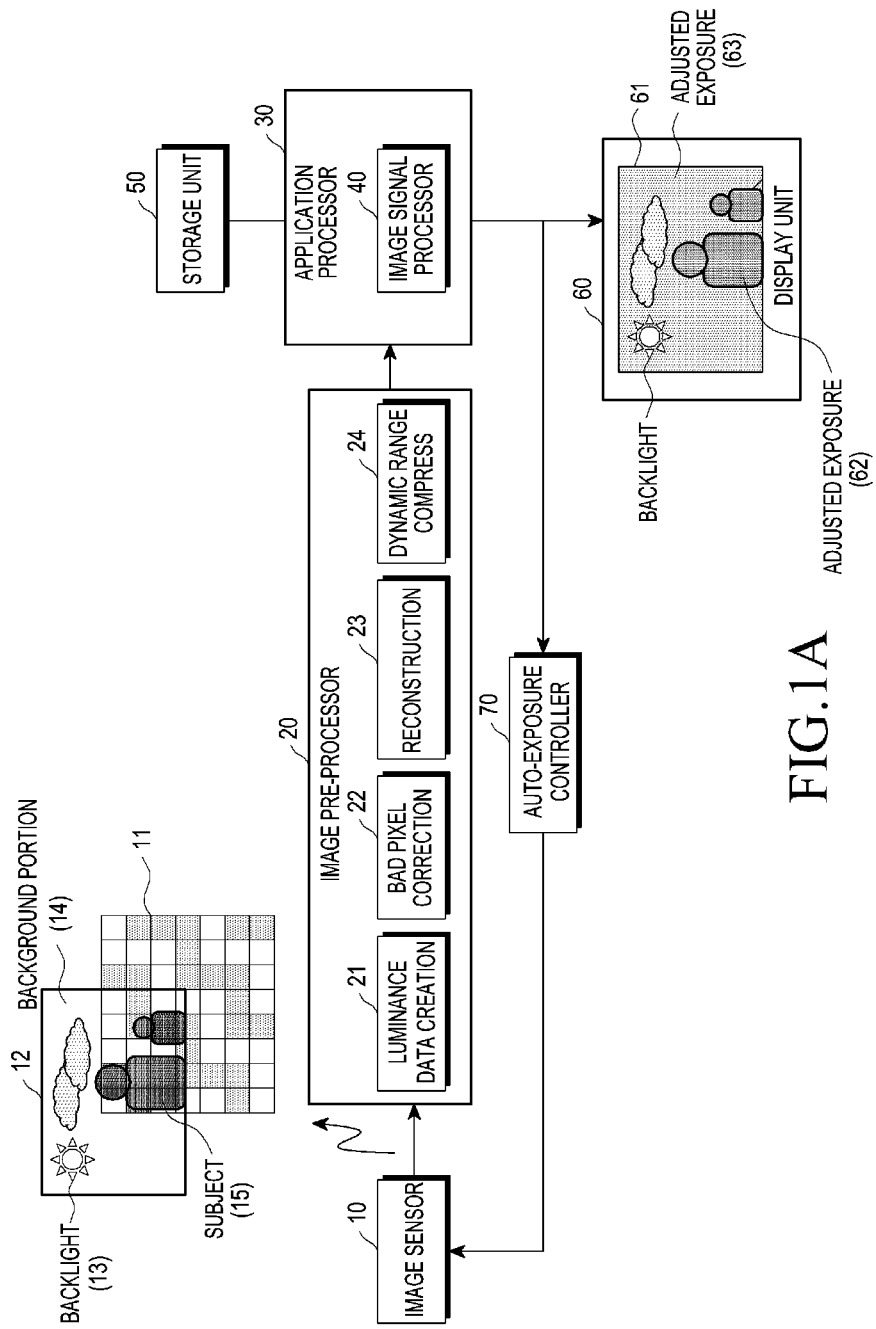
FIG. 1A is a block diagram of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The expressions such as "include" and "may include" which may be used in the present disclosure denote the presence of the disclosed functions, operations, and constituent elements and do not limit one or more additional functions, operations, and constituent elements. In the present disclosure, the terms such as "include" and/or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

Furthermore, in the present disclosure, the expression "and/or" includes any and all combinations of the associated listed words. For example, the expression "A and/or B" may include A, may include B, or may include both A and B.

Although the expressions such as "first" and "second" in the present disclosure can modify various constituent elements of the present disclosure, they do not limit the constituent elements. For example, the above expressions do not limit the sequence and/or importance of the elements. The above expressions are used merely for the purpose to distinguish an element from the other elements. For example, a first user device and a second user device indicate different user devices although both of them are user devices. For example, a first element could be termed a second element, and similarly, a second element could be also termed a first element without departing from the scope of the present disclosure.

In the case where a component is referred to as being "connected" or "accessed" to other component, it should be understood that not only the component is directly connected or accessed to the other component, but also there may exist another component between them. Meanwhile, in the case where a component is referred to as being "directly connected" or "directly accessed" to other component, it should be understood that there is no component therebetween. The terms used in the present disclosure are only used to describe specific embodiments, and are not intended to limit the present disclosure. Singular forms are intended to include plural forms unless the context clearly indicates otherwise.

Hereinafter, an electronic sensor according to various embodiments of the present disclosure will be described with reference to the accompanying drawings. A camera module including the electronic sensor according to the various embodiments of the present disclosure, for example, an image sensor may be mounted to an electronic device.

Such an electronic device may be provided with a camera, a camcorder, a web camera, a surveillance camera, a medical camera, a high speed camera, a multi-camera such as a 3D camera, or the like.

The electronic device according to various embodiments of the present disclosure may include a device having a communication function. For example, the electronic device may include at least one of and/or a combination of various devices such as a smart phone, a tablet Personal Computer (PC), a mobile phone, a video phone, an e-book reader, a desktop PC, a laptop PC, a net-book computer, a Personal Digital Assistant (PDA), a Portable Multimedia Player (PMP), a Motion Picture Expert Group (MPEG) Audio Layer 3 (MP3) player, a mobile medical device, a wearable device, e.g., a Head-Mounted-Device (HMD) such as electronic glasses, electronic clothing, an electronic clock, a wrist watch, an electronic bracelet, an electronic necklace, an electronic accessory, and a smart watch, a home appliance, e.g., a refrigerator, an air-conditioner, a vacuum cleaner, an oven, a microwave oven, a washing machine, an air cleaner, and the like, an artificial intelligence robot, a TeleVision (TV), a Digital Video Disk (DVD) player, an audio, various medical devices, e.g., a Magnetic Resonance Angiography (MRA), a Magnetic Resonance Imaging (MRI), a Computed Tomography (CT), a movie camera, an ultra sonic device, and the like, a navigation device, a Global Positioning System (GPS) receiver, an Event Data Recorder (EDR), a Flight Data Recorder (FDR), a set-top box, a TV box, e.g., a Samsung HomeSync™, an Apple TV™, or a Google TV™), an electronic dictionary, a vehicle infotainment device, electronic equipment for a ship, e.g., navigation equipment for a ship, a gyrocompass, and the like, an avionics, security equipment, electronic clothing, an electronic key, a camcorder, a game consoles, a flat panel display device, an electronic picture frame, an electronic album, furniture or a part of a building/structure including a communication function, an electronic board, an electronic signature receiving device, a projector, and the like. Further, it is apparent to those skilled in the art that the electronic device according to the various embodiments of the present disclosure is not limited to the aforementioned devices.

FIG. 1A is a block diagram of an electronic device according to an embodiment of the present disclosure.

Referring to FIG. 1A, the electronic device may include an image sensor 10, an image pre-processor 20, an Application Processor (AP) 30 including an Image Signal Processor (ISP) 40, a storage unit 50, a display unit 60, and an auto-exposure controller 70. Only the constituent elements associated with the embodiment of the present disclosure are illustrated in FIG. 1A, and it is apparent that the electronic device may also be provided with other elements in addition to the aforementioned constituent elements.

A camera module (not shown) may include the image sensor 10, and the image sensor 10 which is an example of an electronic sensor may detect incident light and may output an electrical image signal corresponding to the detected light when light reflected from a subject is input to the image sensor 10 through a lens. The image sensor 10 may output the image signal obtained by photographing the subject in units of frames. The image sensor 10 includes at least one of a Complementary Metal Oxide Semiconductor (CMOS) sensor, a Charge Coupled Device (CCD) sensor, a Foveon sensor, a complementary image sensor, and the like.

The image sensor 10 is configured with a plurality of pixels 11, and may include an array in which the plurality of pixels 11 are arranged in columns and rows in order to obtain an image having a predetermined size. The array according to an embodiment of the present disclosure may be divided into a first plurality of pixels (not shown) and a second plurality of pixels (not shown) from among the plurality of pixels 11. Here, the first plurality of pixels and the second plurality of pixels may be understood as various pixel arrangements such as a group of pixels, a pair of pixels, at least two adjacent pixels, at least every other pixel, and the like can be made according to various embodiments of the present disclosure. Hereinafter, the first plurality of pixels and the second plurality pixels are referred to as a first group of pixels and a second group of pixels, respectively, and may be collectively referred to as first and second groups of pixels.

The first and second groups of pixels may be configured to have a same exposure time. The first and second groups of pixels may be changed from a state of having the same exposure time to a state of having different exposure times by the auto-exposure controller 70, or the exposure times of the first and second groups of pixels may be changed to be an identical time. On the contrary, the first and second groups of pixels may be changed from a state of having different exposure times to a state of having the same exposure time, or the exposure times of the first and second groups of pixels may be changed by an identical time.

According to an embodiment of the present disclosure, a state in which the first and second groups of pixels have the same exposure time may be defined as an auto-exposure mode, and the state in which the first and second groups of pixels have the different exposure times may be defined as a live High Dynamic Range (HDR) mode. According to an embodiment of the present disclosure, when a condition for changing the exposure times is satisfied, the first and second groups of pixels may be changed from the state of having the same exposure time to the state of having the different exposure times, and vice versa. The switching from the auto-exposure mode to the HDR mode may be made by an automated method, and a release of the HDR mode and a return to the auto-exposure mode may also be made by an automated method.

For example, in the automated method, a predetermined switching condition is checked based on photographed image data, and if the condition is satisfied, the auto-exposure mode may be automatically switched to the HDR mode. According to an embodiment, in the automated method, if the condition is not satisfied in the HDR mode, the HDR mode may be automatically switched to the auto-exposure mode.

In the auto-exposure mode, the image sensor 10 may output first image data and second image data, which may be referred to as first and second image data, based on pixel values of the first and second groups of pixels. The first and second image data, respectively based on the pixel values of the first and second groups of pixels are images containing one or more different pixels at the same exposure time, and there may be no difference between luminance values thereof.

In the HDR mode, the image sensor 10 may output third image data based on pixel values of the first group of pixels and fourth image data based on pixel values of the second group of pixels. Here, the third image data and the fourth image data are respectively generated by differentiating exposures of the first and second groups of pixels targeting an identical subject. For example, the third image data may be a long exposure image data, and the fourth image data may be a short exposure image data. The long exposure image data may obtained by making the exposure for the first group of pixels for a relatively long time, and the short exposure image data may be obtained by making the exposure for the second group of pixels for a relatively short time. One HDR image may be created through correction and composition of the long exposure image data and the short exposure image data.

As described above, the image sensor 10 may have a function of adjusting the amount of exposure by the auto-exposure controller 70. Namely, the amount of exposure for the first and second groups of pixels of the image sensor 10 may be adjusted by the auto-exposure controller 70. In an embodiment of the present disclosure, the amount of exposure for the first and second groups of pixels may be adjusted by an exposure time.

The plurality of pixels 11 configuring the image sensor 10 may be divided into two different pixel groups, which are represented by shaded and not shaded pixels in FIG. 1A, and image data 12 created by the plurality of pixels 11 may be transferred to the image pre-processor 20.

The image pre-processor 20 may pre-process the image data 12 transferred from the image sensor 10 on the front end of the image signal processor 40. In a case of photographing a subject against backlight 13, the image sensor 10 may output the image data 12 in which a subject 15 located in front of the backlight 13 becomes black on account of an under-exposure and a background portion 14 becomes white on account of an over-exposure.

The image pre-processor 20 may perform image processing, such as luminance data creation 21, Bad Pixel Correction (BPC) 22, reconstruction 23, Dynamic Range Compression (DRC) 24, and the like.

Since the image pre-processor 20 receives one piece of image data from the image sensor 10 in the auto-exposure mode, the image pre-processor 20 may not perform the reconstruction function 23 and may also omit the dynamic range compression function 24. In contrast, in a case of composing two pieces of image data having different exposure times in the HDR mode, a quality of the HDR image, which is a composite image, may be deteriorated due to data loss generated in the composing process. With this in mind, the image pre-processor 20 may correct the two pieces of image data having the different exposure times to prevent deterioration of the image quality.

To this end, the bad pixel correction 22, the reconstruction 23, and the dynamic range compression 24 may serve as an example of image processing techniques that the image pre-processor 20 may perform. Here, the reconstruction function 23 may serve to form a long exposure image and a short exposure image using the pixel values contained in the long exposure image data and the short exposure image data and to merge them into one HDR image through interpolation and composition.

As described above, the image data can be pre-processed through some configurations of the image pre-processor 20 on the front end of the image signal processor 40. Furthermore, the remaining image processing operations other than the image processing operations performed by the image pre-processor 20 may be performed by the image signal processor 40. According to an embodiment of the present disclosure, at least one processor configured to process the image data, for example, the image pre-processor 20, the AP 30, and the image signal processor 40 may be independent of each other in the electronic device, and it may be implemented as illustrated in FIG. 1A that the image pre-processor 20 is disposed on the front end of the image signal processor 40 and the image signal processor 40 is included in the AP 30.

Figure 1B:
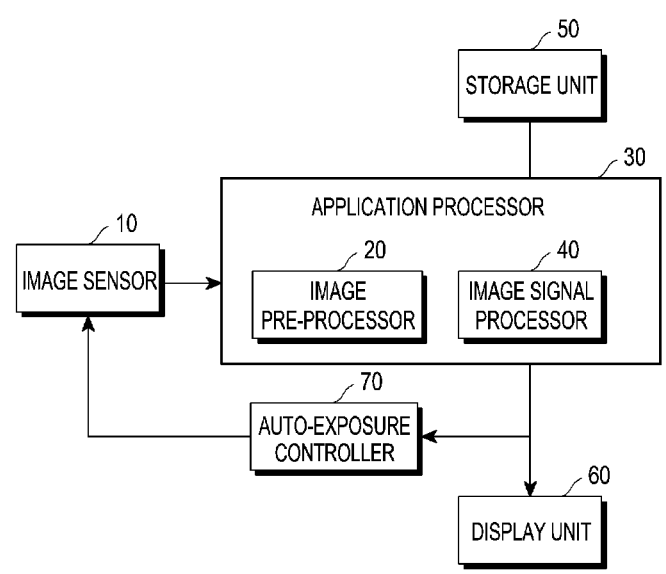
FIG. 1B is a block diagram of an electronic device according to another embodiment of the present disclosure.

FIG. 1B is a block diagram of an electronic device according to another embodiment of the present disclosure.

Referring to FIG. 1B, and in contrast to FIG. 1A, all or some configurations of the image pre-processor 20 may be implemented within the AP 30. Although the AP 30 includes the image pre-processor 20 and an image signal processor 40 in FIG. 1B, configurations of the image pre-processor 20 may also be implemented to be performed by the image signal processor 40, in which case the image pre-processor 20 may be omitted.

The image signal processor 40 may receive real-time image data photographed by the image sensor 10, and may process the image data to be suitable for screen characteristics, such as a size, a definition, a resolution, and the like, of the display unit 60 or screen characteristics of other display units. Such an image processing function includes functions such as gamma correction, interpolation, a spatial change, an image effect, an image scale, Auto White Balance (AWB), Auto Exposure (AE), Auto Focus (AF), and the like. Furthermore, the image signal processor 40 may operate in an auto-exposure mode based on at least one of a matrix metering type, a touch auto-exposure type, a center weighted metering type, and a spot metering type.

The image signal processor 40 may be implemented to be included in the AP 30 performing a multimedia function for smooth execution and control of various additional functions such as a camera function, a multimedia data reproduction function, and the like.

The image signal processor 40 may configure a reference exposure time in the auto-exposure mode. The reference exposure time may be a time interval during which a first group of pixels and a second group of pixels of the image sensor 10 are equally exposed. Various methods may be used as a method of configuring the reference exposure time. The image signal processor 40 according to an embodiment of the present disclosure may create a histogram based on luminance data, and may use the histogram to determine a long exposure time and a short exposure time as well as the reference exposure time. That is, the histogram analysis may be used to determine a degree of saturation of an image.

The image signal processor 40 may determine whether a predetermined mode switching condition is satisfied based on pixel values of the first and second groups of pixels of the image sensor 10, which are obtained for the reference exposure time. If the mode switching condition is satisfied, the image signal processor 40 may differently configure exposure times for the first and second groups of pixels by controlling an auto-exposure controller 70. Accordingly, the auto-exposure controller 70 may control an amount of exposure of the image sensor 10 with reference to the configured exposure times, namely, the long exposure time and the short exposure time.

For example, in a case of photographing a subject against the backlight 13, the image sensor 10 may output the image data 12, in which a subject 15 located in front of the backlight 13 becomes black on account of an under-exposure and a background portion 14 becomes white on account of an over-exposure. In this case, even though the image signal processor 40 controls the auto-exposure controller 70 to adjust the reference exposure time in the auto-exposure mode, an image to be displayed on the display unit 60 consequently becomes brighter or darker on the whole. In this case, a black portion caused by the under-exposure and a white portion caused by the over-exposure need to be corrected to have a different luminance. That is, the black portion needs to be corrected to be brighter, and the white portion needs to be corrected to be darker.

In a case of obtaining an image having both an over-exposed region and an under-exposed region in the auto-exposure mode, when a mode switching condition is satisfied through histogram analysis, the image signal processor 40 may switch to the HDR mode. Here, the over-exposed region may mean a case in which the number of pixel luminance values of the first and second groups of pixels, which are higher than a first reference selected from the histogram, is larger than a first threshold value, and the under-exposed region may mean a case in which the number of pixel luminance values of the first and second groups of pixels, which are lower than a second reference selected from the histogram, is smaller than a second threshold value.

Two or more pieces of image data captured with different exposure times may be output from the image sensor 10, and the image pre-processor 20 may perform image pre-processing for a long exposure image acquired with the long exposure time and a short exposure image acquired with the short exposure time. As described above, according to an embodiment of the present disclosure, the correction may be performed for a relatively dark region, for example, the black portion, caused by the under-exposure using the long exposure group of pixels in the image sensor 10. Since the long exposure group of pixels is exposed for a relatively longer period of time as compared with the short exposure group of pixels so that a large amount of light is input thereto, an image with an appropriate exposure may be obtained using the long exposure group of pixels. Further, correction may be performed for a relatively bright region, for example, the white portion, caused by the over-exposure using the short exposure group of pixels. The exposure time for the short exposure group of pixels is configured to be shorter than the exposure time for which an image is captured in the auto-exposure mode, thereby making it possible to correct the bright region.

Accordingly, the image pre-processor 20 may create one HDR image by interpolating the long exposure image obtained by the long exposure group of pixels and the short exposure image obtained by the short exposure group of pixels. The image signal processor 40 may display an HDR image 61 (see FIG. 1A) on the display unit 60. The HDR image 61, similar to an image obtained by an appropriate adjustment of an exposure, may be acquired, in which case the background which was relatively bright due to the over-exposure has an adjusted exposure 63 that is adjusted such that luminance thereof is decreased, and the subject, which was relatively dark due to the under-exposure, has an adjusted exposure 62 that is adjusted such that luminance thereof is increased.

The storage unit 50 may include an image buffer storing the image formed based on the image data acquired from the image sensor 10 according to frames. Furthermore, the storage unit 50 may store an auto-exposure table for determining the reference exposure time in the auto-exposure mode and an HDR table for determining the long exposure time and the short exposure time in the HDR mode. For example, in a case where there are the over-exposed region and the under-exposed region on the histogram, the related long and short exposure times may be extracted from the HDR table depending on the histogram. Table values may have, for example, a mean value experimentally measured in various photography environments as well as a basic setting value of a camera, and may also be configured by a user through an option menu.

Although the electronic device may be configured to include the detailed constituent elements, such as the image pre-processor 30 and the image signal processor 40, as illustrated in FIGS. 1A and 1B, the electronic device may be largely divided into an image sensor for converting image data into an electrical signal and an image processor for processing the electrical signal.

Figure 2:
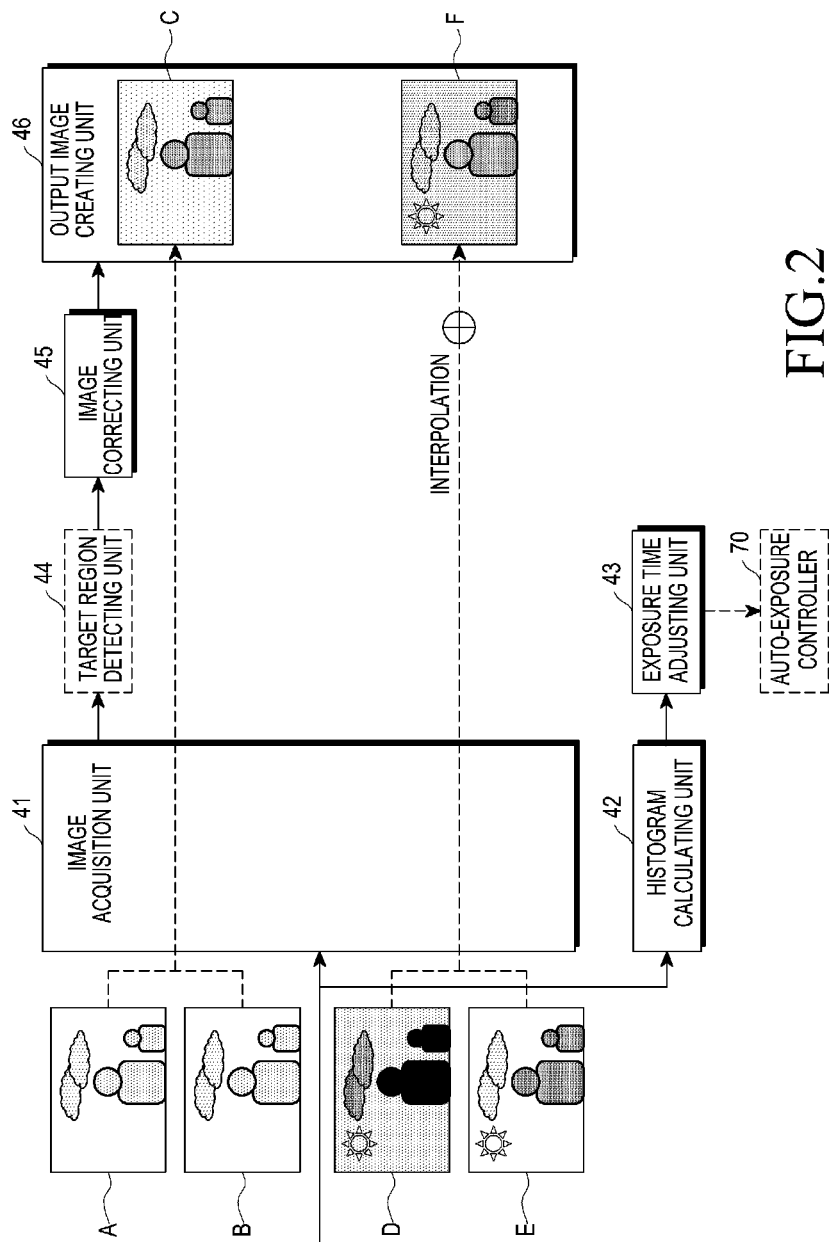
FIG. 2 is a block diagram of an image processing device for processing image data output from an image sensor according to an embodiment of the present disclosure.

FIG. 2 is a block diagram of an image processing device for processing image data output from an image sensor according to an embodiment of the present disclosure.

Referring to FIG. 2, image data output from the image sensor 10 may be transferred to an image acquisition unit 41, and luminance data based on the image data may be transferred to a histogram calculating unit 42.

In a case of operating in an auto-exposure mode, the image acquisition unit 41 may acquire, from the image sensor 10, at least one piece of image data obtained by using a first group of pixels and a second group of pixels at the same exposure time. If an image is captured in a bright outdoor space, a white-saturated portion caused by an over-exposure may be generated on image data A and B obtained by using the first group of pixels and the second group of pixels at the same exposure time. Here, in a case of the same exposure time, there may be no luminance difference between image data A, obtained based on the first group of pixels, and image data B, obtained based on the second group of pixels.

The histogram calculating unit 42 may create a histogram based on the luminance values of the first group of pixels and the second group of pixels, and may determine an over-exposure or under-exposure based on the histogram.

For example, the histogram calculating unit 42 may calculate luminance values for the image data A and the image data B received from the image sensor, and an exposure time adjusting unit 43 may stepwise differentiate information on the calculated luminance values and may determine a reference exposure time based on the differentiated luminance value information. Such a reference exposure time may be configured by various methods, such as a method of configuring the reference exposure time with reference to a histogram of image data displayed in a preview mode prior to capturing.

The luminance values may be calculated based on luminance data generated by an image pre-processor 20. The histogram calculating unit 42 creates a histogram based on the luminance data, in which the histogram, a graph depicting a frequency distribution, is used to measure an exposure of an image in a field of a camera and represents a distribution of brightness values for pixels in an image.

When the histogram calculating unit 42 determines that the over-exposure or under-exposure has been generated, the exposure time adjusting unit 43 may adjust the reference exposure time of the first group of pixels and the second group of pixels, and may adjust an exposure time of the image sensor under the control of an auto-exposure controller 70. With the adjustment of the reference exposure time, the luminance values of the image data transferred to the image acquisition unit 41 may also be adjusted, and after correction through an image correcting unit 45, an output image creating unit 46 may output an output image C of which a luminance value is adjusted according to the over-exposure or under-exposure. Accordingly, the saturation phenomenon generated on the image data A and the image data B captured in the bright outdoor space disappears with the adjustment of the reference exposure time, thereby obtaining the luminance adjusted for the output image C.

However, when the over-exposure and the under-exposure are simultaneously generated on the image data on account of backlight, it may be difficult to solve both the over-exposure and the under-exposure at one time only through the luminance adjustment. In an embodiment of the present disclosure, when the over-exposure and the under-exposure are simultaneously generated, the exposure times of the first and second groups of pixels may be changed to have mutually different states. Furthermore, in another embodiment of the present disclosure, when one of the over-exposure and the under-exposure is generated on image data captured with the same exposure time, the exposure times of the first and second groups of pixels of the image sensor may be changed by an identical time.

To this end, a comparison may be made between a case in which the number of pixel luminance values higher than a first reference, selected based on the histogram in the histogram calculating unit 42, is larger than a first threshold value, and a case in which the number of pixel luminance values lower than a second reference, selected based on the histogram, is smaller than a second threshold value. A degree to which the number of pixel luminance values higher than the selected first reference is larger than a first threshold value may be mapped onto an exposure time of pixels that have to be processed with a short exposure. Furthermore, a degree to which the number of pixel luminance values lower than the selected second reference is smaller than the second threshold value may be mapped onto an exposure time of pixels that have to be processed with a long exposure.

Accordingly, if a ratio of the long exposure time to the short exposure time is larger than or equal to a threshold ratio, the exposure time adjusting unit 43 may determine the long exposure time and the short exposure time such that the exposure times of the first and second groups of pixels are different from each other. At this time, the determination and the adjustment of the long and short exposure times may be made with reference to the pre-stored HDR table. For example, in determining the exposure time, assuming that an exposure time for an appropriate exposure is 1/250 and an exposure ratio is 1 to 4, the long exposure pixels may have an exposure time of 1/125 and the short exposure pixels may have an exposure time of 1/500. Various pieces of image information detected from respective pixels may be combined through the controller of the electronic device to complete a captured image.

The auto-exposure controller may control the image sensor depending on the long and short exposure times determined by the exposure time adjusting unit 43. Accordingly, for the predetermined long exposure time, long exposure image data may be obtained based on pixel values of pixels designated as a long exposure group of the image sensor, and for the short exposure time, short exposure image data may be obtained based on pixel values of pixels designated as a short exposure group of the image sensor.

The image acquisition unit 41 may acquire two pieces of image data captured with different exposure times, namely, long exposure image data D and short exposure image data E. At this time, the long exposure image data D, captured with the different exposure time, may be dark on the whole on account of an under-exposure caused by backlight, and the short exposure image data E may be bright on the whole on account of an over-exposure. In this case, the exposure time adjusting unit 43 adjusts the long and short exposure times based on the histogram by the histogram calculating unit 42. Accordingly, the long exposure image data and the short exposure image data, which are captured with the adjusted long and short exposure times, may be obtained. At this time, the long exposure image data captured with the adjusted long exposure time may be image data of which the luminance is corrected for the under-exposure, and the short exposure image data captured with the adjusted short exposure time may be image data of which the luminance is corrected for the over-exposure.

The image correcting unit 45 may perform an operation of correcting a difference between the long exposure image data and the short exposure image data. Accordingly, the output image creating unit 46 may composite the long exposure image data and the short exposure image data, and a composite image F, which may also be referred to as an HDR image F, may appear as an HDR image to a user. The HDR image F may be created by composing the corrected short exposure image and the corrected long exposure image. The luminance of the over-exposed portion is decreased and the luminance of the under-exposed portion is increased, so that the HDR image F may appear as an image close to reality on the whole even in a backlight state. Thus, an image having an expanded dynamic range may be obtained for the same subject.

At this time, the bright region and the dark region of the image may vary depending on a capturing time point and/or a subject. The electronic device provided with the image sensor according to the various embodiments of the present disclosure may also rearrange the long exposure pixels and the short exposure pixels by recognizing the bright region and the dark region on the image of the subject. Furthermore, a specific region on the image may also be configured as a Region of Interest (ROI) according to an intention of a user manipulating the electronic device. To this end, the image processing device may further include a target region detecting unit 44.

For example, when under-exposure or over-exposure is generated in a portion where a face or text exists on an image, the target region detecting unit 44 may differently apply the long exposure time and/or the short exposure time for the portion where the face or text exists as compared with other portions.

To this end, the target region detecting unit 44 may analyze the image data to detect the region where the face or text exists based on a face recognition algorithm and a text recognition algorithm. For example, when the target region detecting unit 44 detects a face in the over-exposed region, the exposure time adjusting unit 43 may configure a ratio of the short exposure to be higher than the total exposure time, and on the contrary, when the target region detecting unit 44 detects a face in the under-exposed region, the exposure time adjusting unit 43 may configure a ratio of the long exposure to be higher than the total exposure time to perform photography and composition. Furthermore, the target region detecting unit 44 may configure the ratio of the long exposure to be higher in a region of interest on the image data. In a different way, the target region detecting unit 44 may control such that more long exposure pixels are arranged in the region of interest on the image data than the short exposure pixels.

Figure 3A:
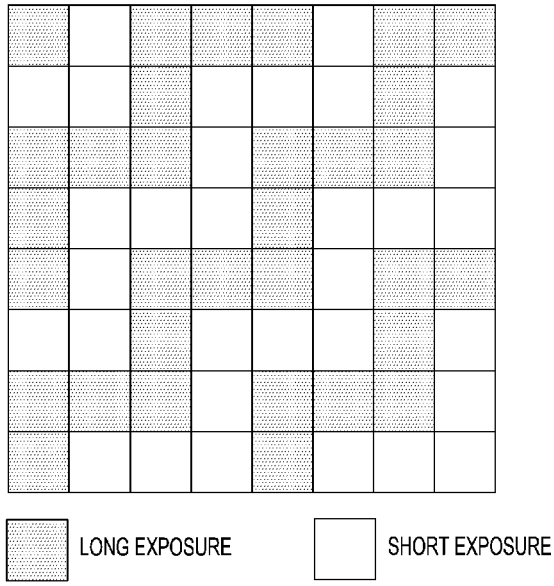
FIGS. 3A and 3B illustrate an example of an arrangement of a plurality of pixels in an image sensor according to an embodiment of the present disclosure.
Figure 3B:
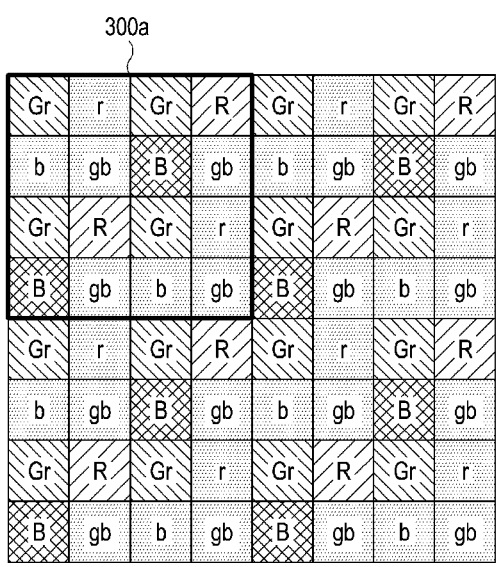

FIGS. 3A and 3B illustrate an example of an arrangement of a plurality of pixels in an image sensor according to an embodiment of the present disclosure.

Referring to FIG. 3A, it is exemplified that a first group of pixels, which may be the first plurality of pixels, and a second group of pixels, which may be the second plurality of pixels, of the image sensor 10 are arranged according to a pattern selected from some regions of an array. In a case where the first group of pixels is defined as long exposure pixels and the second group of pixels is defined as short exposure pixels, the long and short exposure pixels may have a polygonal shape. For example, an arrangement may be made such that at least two immediately adjacent pixels of the long exposure pixels do not share one side of a polygon and at least two immediately adjacent pixels of the short exposure pixels do not share one side of a polygon.

FIG. 3B illustrates an arrangement of the long and short exposure pixels in a case where a mask 300a has a size of 4×4. In the mask 300a, Gr, R, and B pixels are designated as the long exposure pixels, and remaining r, b, and gb pixels, other than the Gr, R, and B pixels, are designated as the short exposure pixels. For example, in FIG. 3B, three long exposure pixels and one short exposure pixel may be alternately arranged in the horizontal direction in every odd row, and three short exposure pixels and one long exposure pixel may be alternately arranged in the horizontal direction in every even row. At this time, the long exposure pixel in the even row may be arranged to be adjacent to the long exposure pixels in the contiguous odd rows.

Through the arrangement described above, as illustrated in FIG. 3A, a cross stripe pattern may be represented in which horizontal lines configured with the long exposure pixels and vertical lines configured with the short exposure pixels intersect each other at a predetermined distance, in which case the distance by which the horizontal lines intersect the vertical lines may be mutually different. Accordingly, the long exposure pixels and the short exposure pixels may appear as a stepwise pattern in a diagonal direction.

Although the three long exposure pixels or the three short exposure pixels are arranged at a predetermined distance in the aforementioned embodiment, various arrangements can be made. For example, at least two of the first group of pixels and one of the second group of pixels may be alternately arranged.

According to various embodiments of the present disclosure, amounts of exposure of the first and second groups of pixels may be configured to be different from each other depending on a dynamic range of bright and dark regions of an image formed on the image sensor. According to an embodiment of the present disclosure, the amounts of exposure of the first and second groups of pixels may be configured by at least one of an exposure time, photoelectric conversion efficiency, and aperture settings.

The image sensor, according to the various embodiments of the present disclosure, may be controlled by a method including an operation of configuring some of the pixels configuring the image sensor as a first pixel group detecting a subject image for a preconfigured exposure time, and an operation of configuring at least some of the remaining pixels configuring the image sensor as a second pixel group detecting the subject image for an exposure time configured to be shorter than that of the first pixel group.

According to an embodiment, from among the pixels corresponding to a region of an image formed on the image sensor, pixels configured to have a high pixel output value may be arranged as pixels belonging to the first pixel group, and pixels configured to have a low pixel output value may be arranged as pixels belonging to the second pixel group.

According to an embodiment, an arrangement of the pixels configuring the first pixel group and the pixels configuring the second pixel group may be dynamically allocated through the above-described method.

According to an embodiment, the pixels configuring the first pixel group and the pixels configuring the second pixel group may be arranged in a repeated or irregular pattern through the above-described method.

According to an embodiment, the above-described method enables the pixels of the second pixel group to detect an exposure image at least twice with different exposure times while the pixels of the first pixel group are being exposed.

According to an embodiment, through the above described method, an ROI may be configured on the image formed on the image sensor, and more pixels configuring the first pixel group may be arranged in the ROI than the pixels configuring the second pixel group.

Figure 4:
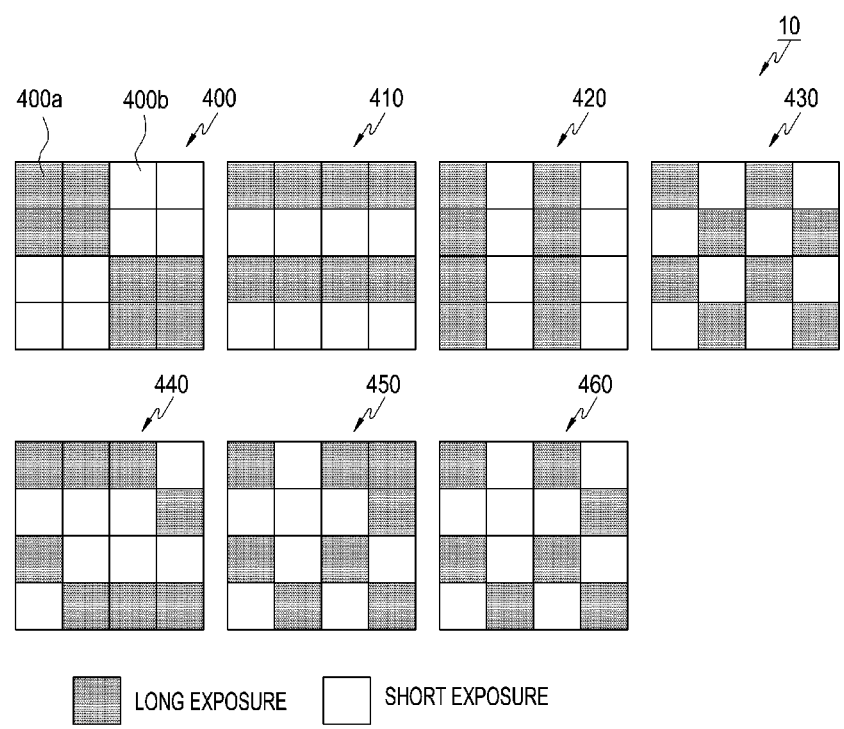
FIG. 4 illustrates an example of various arrangements of a plurality of pixels in an image sensor according to an embodiment of the present disclosure.

FIG. 4 illustrates an example of various arrangements of a plurality of pixels in an image sensor according to an embodiment of the present disclosure.

Various arrangements, that is patterns 400, 410, 420, 430, 440, 450, and 460, of a first group of pixels 400a, which may be referred to as long exposure pixels 400a, and a second group of pixels 400b, which may be referred to as short exposure pixels 400b, of the image sensor 10 are illustrated in FIG. 4. For example, as described above, the live HDR function can be performed by dividing pixels in the pattern 400, configuring the image sensor 10 into at least two pixel groups having different exposure amount settings and arranging the divided pixel groups. As illustrated in FIG. 4, the long exposure pixels 400a and the short exposure pixels 400b may be arranged in any of the patterns 400, 410, 420, and 430, which may be referred to as repeated patterns 400, 410, 420, and 430, or arranged in any of the patterns 440, 450, and 460, which may be referred to as irregular patterns 440, 450, and 460.

Dividing the pixels of the pattern 400, configuring the image sensor 10, into at least two pixel groups having the different exposure amount settings and arranging the divided pixel groups may be fixedly configured in a process of manufacturing the image sensor 10 or dynamically configured according to a capturing mode of a device to which the image sensor 10 is mounted.

In describing various embodiments of the present disclosure, the expression 'the exposure amount settings are different from each other' may mean that a duration of time for which the long exposure pixels 400a are exposed is different from a duration of time for which the short exposure pixels 400b are exposed. In order to differently configure the amounts of exposure, the short exposure pixels 400b and the long exposure pixels 400a may be simultaneously exposed in some embodiments. On the contrary, it is not necessary to simultaneously expose the long exposure pixels 400a and the short exposure pixels 400b. In some embodiments, in order to differently configure the amounts of exposure, photoelectric conversion efficiency of the long exposure pixels 400a may be configured to be different from that of the short exposure pixels 400b. In some embodiments, in order to differently configure the amounts of exposure, aperture setting of the long exposure pixels 400a may be configured to be different from that of the short exposure pixels 400b. In some embodiments, in order to differently configure the amounts of exposure, a pixel size of the long exposure pixels 400a may be configured to be different from that of the short exposure pixels 400b, or an amount of light input to a pixel per unit time may be adjusted through a control of a lens or filter.

FIGS. 5, 6, 7, 8, and 9 are graphs related to an exposure operation of pixels of an image sensor according to various embodiments of the present disclosure.

Figure 5:
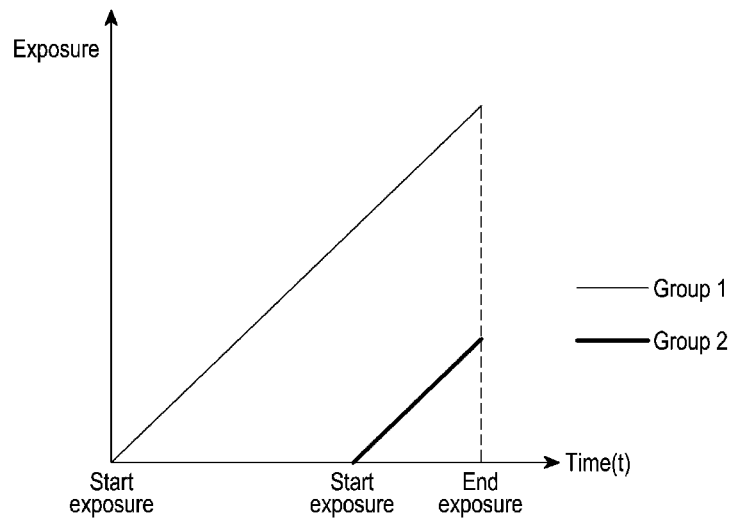
FIGS. 5, 6, 7, 8, and 9 are graphs related to an exposure operation of pixels of an image sensor according to an embodiment of the present disclosure.

Referring to FIG. 5, in the image sensor 10 according to various embodiments of the present disclosure, a second pixel group, which may be referred to as Group 2, configured with second pixels, for example, a group of short exposure pixels 400a, starts an exposure operation later than a first pixel group, which may be referred to as Group 1, configured with first pixels, for example, a group of long exposure pixels 400*a*, and the pixels of the first pixel group and the pixels of the second pixel group may simultaneously complete the exposure operation.

Figure 6:
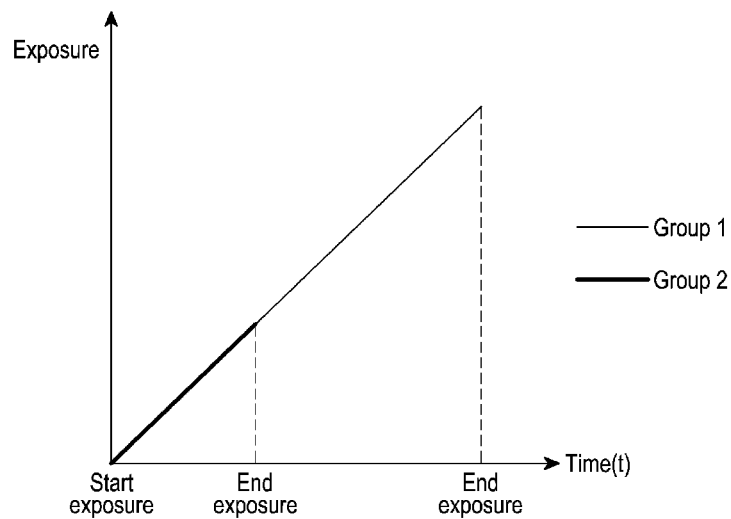

Referring to FIG. 6, in the image sensor 10 according to various embodiments of the present disclosure, the pixels of the first pixel group and the pixels of the second pixel group may simultaneously start an exposure operation, and the pixels of the second pixel group may complete the exposure operation earlier than the pixels of the first pixel group. In addition, although not illustrated, the pixels of the second pixel group (Group 2) may also start an exposure operation later and complete the exposure operation earlier as compared with the pixels of the first pixel group (Group 1).

Figure 7:
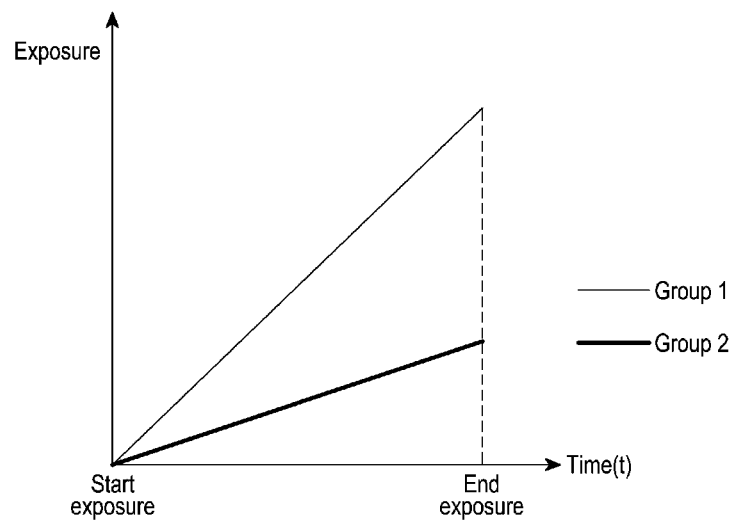

Referring to FIG. 7, in the image sensor 10 according to various embodiments of the present disclosure, the pixels of the first pixel group and the pixels of the second pixel group may simultaneously start an exposure operation, perform the exposure operation with different photoelectric efficiency, and simultaneously complete the exposure operation.

Figure 8:
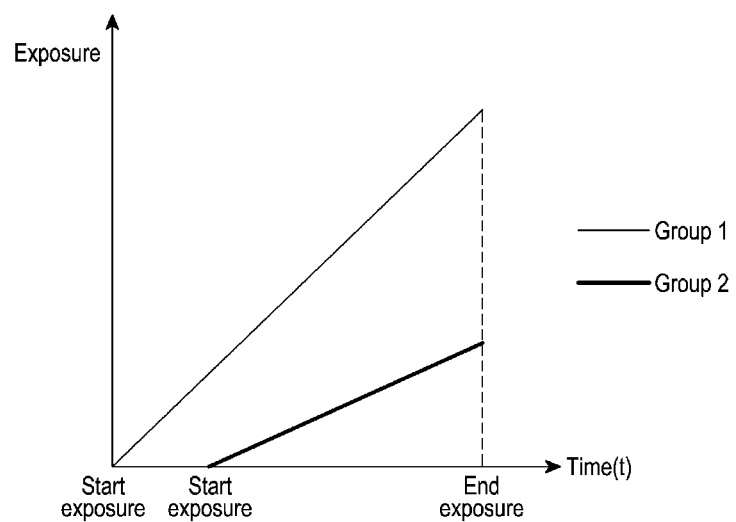

Referring to FIG. 8, in the image sensor 10 according to various embodiments of the present disclosure, the second pixel group may start an exposure operation later than the first pixel group, and the first and second pixel groups may perform the exposure operation with different photoelectric efficiency and then simultaneously complete the exposure operation.

Figure 9:
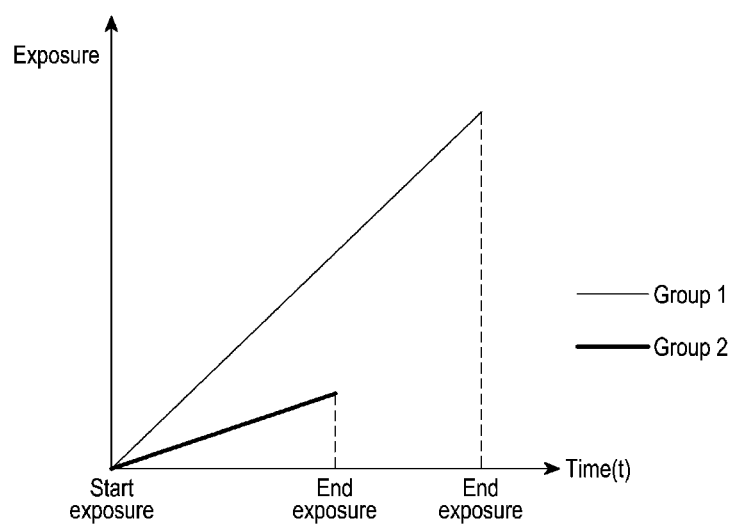

Referring to FIG. 9, in the image sensor 10 according to various embodiments of the present disclosure, the pixels of the first pixel group and the pixels of the second pixel group may simultaneously start an exposure operation and perform the exposure operation with different photoelectric efficiency, and the second pixel group may complete the exposure operation earlier than the first pixel group. As described above, the first and second pixel groups may also have different exposure times while operating with different photoelectric conversion efficiency.

Figure 10:
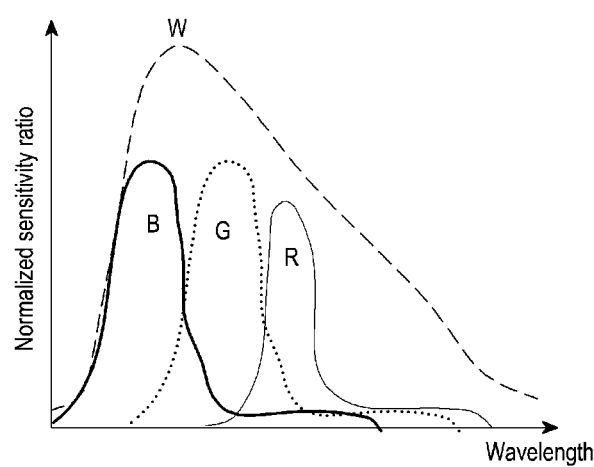
FIG. 10 is a graph illustrating characteristics of color filters according to an embodiment of the present disclosure.

FIG. 10 is a graph illustrating characteristics of color filters according to an embodiment of the present disclosure.

An image sensor 10 according to an embodiment of the present disclosure may be provided with color filters corresponding to the long exposure pixels 400*a* and the short exposure pixels 400*b*. For example, the color filters may include a white light filter W, a red light filter R, a green light filter G, a blue light filter B, or a filter transmitting or interrupting another color of light. The color filters may have a different transmittance depending on a wavelength of incident light. For example, referring to FIG. 10, the white light filter W may have a higher normalized sensitivity ratio as compared with the red, green, and blue light filters R, G, and B, and normalized sensitivity ratios of the red, green, and blue light filters R, G, and B may be similar to each other. Accordingly, for the same exposure time, pixels arranged to correspond to the white light filter W may have more exposure than other pixels.

Figure 11A:
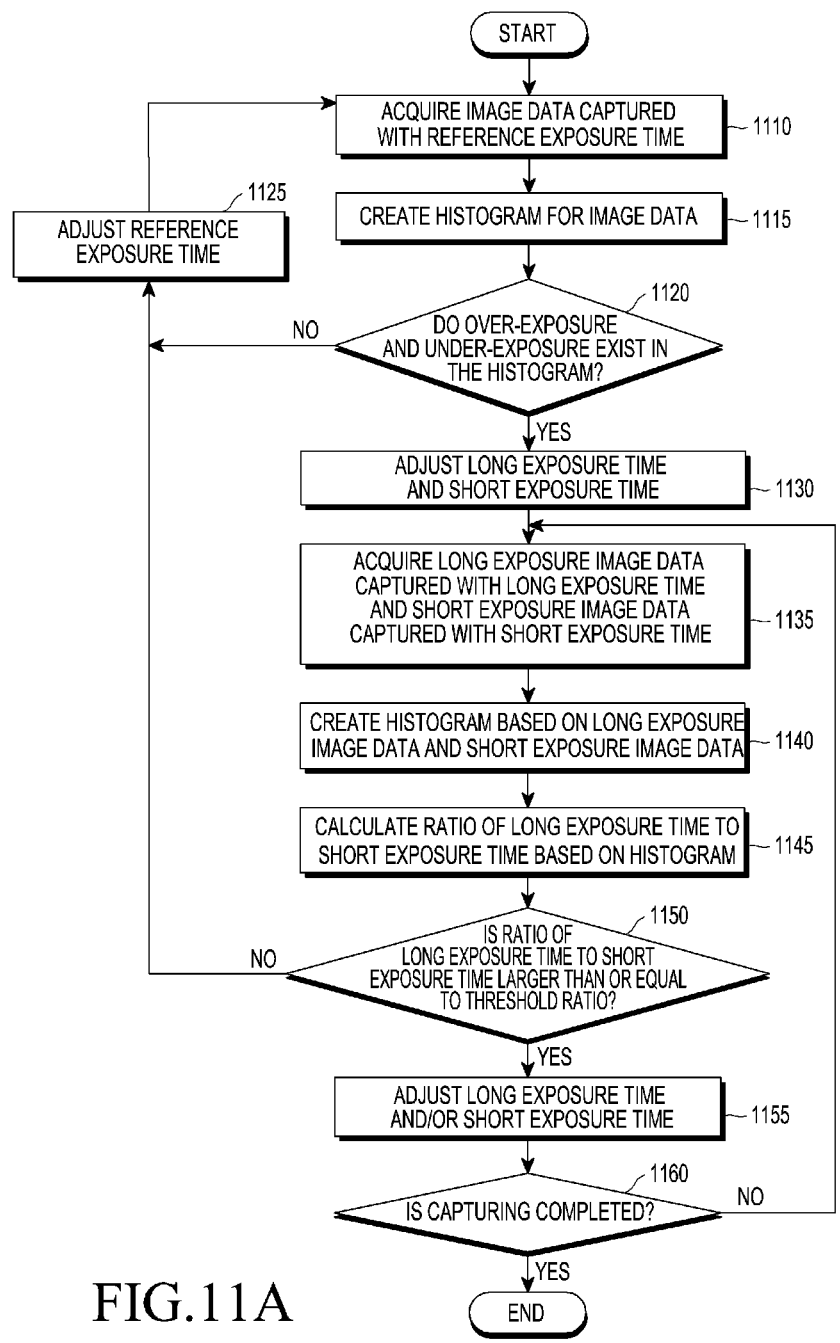
FIG. 11A is a flowchart illustrating a method of controlling an image sensor when an auto-exposure mode is switched to a live High Dynamic Range (HDR) mode according to an embodiment of the present disclosure.
Figure 12:
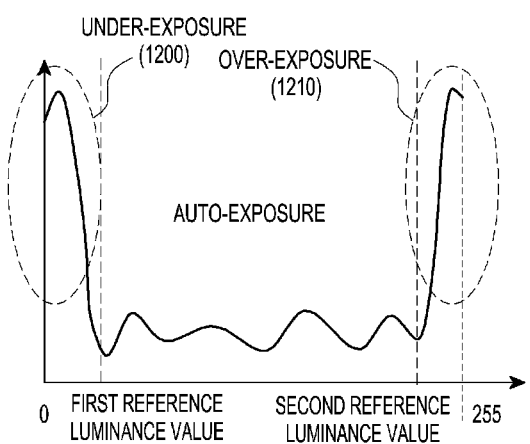
FIG. 12 illustrates an example of a histogram based on image data captured in an auto-exposure mode according to an embodiment of the present disclosure.

FIG. 11A is a flowchart illustrating a method of controlling an image sensor when an auto-exposure mode is switched to a live HDR mode according to an embodiment of the present disclosure, and FIG. 12 illustrates an example of a histogram based on image data captured in an auto-exposure mode according to an embodiment of the present disclosure.

Referring to FIGS. 11A and 12, a description will be given with reference to FIG. 12 in order to help with comprehension of operations illustrated in FIG. 11A. As shown in FIG. 11A, at operation 1110, an electronic device acquires image data captured through the image sensor 10 with a reference exposure time for which an amount of exposure of a first group of pixels is the same as that of a second group of pixels, and then, in operation 1115, the electronic device may create a histogram for the image data. The histogram may be created based on luminance data, and may be used to determine a long exposure time and a short exposure time as well as the reference exposure time.

Referring to FIG. 12, there may be bright and dark regions in an image according to a capture time point and/or a subject, and for example, in the case of capturing a subject against backlight, a luminance difference between bright and dark regions in the captured image may be considerably large. Accordingly, as illustrated in FIG. 12, there may be an over-exposed region 1210 and an under-exposed region 1200 on the histogram.

In the histogram illustrated in FIG. 12, the over-exposed region 1210 may mean a case in which the number of pixel luminance values of the first and second groups of pixels higher than a second reference luminance value is larger than a first threshold value, and the under-exposed region 1200 may mean a case in which the number of pixel luminance values of the first and second groups of pixels lower than a first reference luminance value is smaller than a second threshold value. Accordingly, the over-exposed region of the image having a relatively high luminance value may be highly distributed while being biased to a right side of the histogram. Furthermore, the under-exposed region of the image having a relatively low luminance value may be highly distributed while being biased to a left side of the histogram.

Accordingly, in operation 1120, the electronic device may determine whether the over-exposure and the under-exposure exist in the histogram. If both the over-exposure and the under-exposure exist in the histogram, the electronic device may adjust a long exposure time and/or a short exposure time in operation 1130. In other words, the electronic device may adjust at least one of exposure times of the first and second groups of pixels such that the exposure times of the first and second groups of pixels are different from each other.

However, only one of the over-exposure and the under-exposure may be generated in the image data captured while the exposure times of the first and second groups of pixels are identical to each other. When it is determined, in operation 1120, that the over-exposure and the under-exposure do not coexist together, the electronic device may adjust the reference exposure time in operation 1125. Furthermore, in the case where the over-exposure and the under-exposure do not coexist together, the function of adjusting the reference exposure time, i.e., operation 1125, may include a function of maintaining the reference exposure time. Here, since the exposure times of the first and second groups of pixels were identical to the reference exposure time, the adjustment of the reference exposure time may mean changing the exposure times of the first and second groups of pixels by an identical time. A degree of changing the exposure times may be determined based on the histogram. Here, independently of the adjustment of the reference exposure time or the long and short exposure times, an image signal processor 40 may perform a control such that an image is created based on image data captured with the adjusted reference exposure time or the adjusted long and short exposure times and is displayed on a display unit 60.

Specifically, the electronic device may compare a degree to which the number of pixel luminance values higher than the first reference selected based on the histogram is larger than the second threshold value with a degree to which the number of pixel luminance values lower than the selected second reference is smaller than the first threshold value. Accordingly, when the degree to which the number of pixel luminance values higher than or equal to the selected reference is larger than the first threshold value is mapped onto the short exposure time and the degree to which the number of pixel luminance values lower than or equal to the selected another reference is smaller than the first threshold value is mapped onto the long exposure time, a ratio of the long exposure time to the short exposure time may be calculated through a histogram analysis.

When the ratio of the long exposure time to the short exposure time is larger than a first threshold ratio, the electronic device may switch to a mode for adjusting the long exposure time and/or the short exposure time. When the ratio of the long exposure time to the short exposure time is not larger than the first threshold ratio, the electronic device may change the long exposure time and the short exposure time by an identical time. That is, the electronic device may adjust the reference exposure time. When the ratio of the long exposure time to the short exposure time based on the histogram is smaller than or equal to a second threshold ratio, while the electronic device operates in the mode for adjusting the long exposure time and/or the short exposure time, the electronic device may return to the auto-exposure mode, and this will be described below with reference to FIG. 18. Here, the first and second threshold ratios may have the same value.

The electronic device may acquire long exposure image data captured with the adjusted long exposure time and short exposure image data captured with the adjusted short exposure time in operation 1135, and may create histograms based on the long exposure image data and the short exposure image data, i.e., for the respective image data, in operation 1140. The electronic device may calculate a ratio of the long exposure time to the short exposure time based on the histogram in operation 1145, and may determine whether the ratio of the long exposure time to the short exposure time is larger than or equal to a threshold ratio in operation 1150. If the ratio of the long exposure time to the short exposure time is larger than or equal to the threshold ratio, the electronic device may adjust the long exposure time and/or the short exposure time in operation 1155, and may the determine if the capturing is completed in operation 1160. On the other hand, if the ratio of the long exposure time to the short exposure time is not larger than or equal to the threshold ratio, as determined in operation 1150, the electronic device may return to operation 1125 to adjust the reference exposure time. As described above, according to the various embodiments of the present disclosure, in the case where the ratio of the long exposure time to the short exposure time is not smaller than, or according to a design choice, not larger than, the threshold ratio, the image signal processor 40 may control such that an HDR image is created through interpolation based on the image data captured with the adjusted long and short exposure times and is displayed on the display unit 60.

Figure 11B:
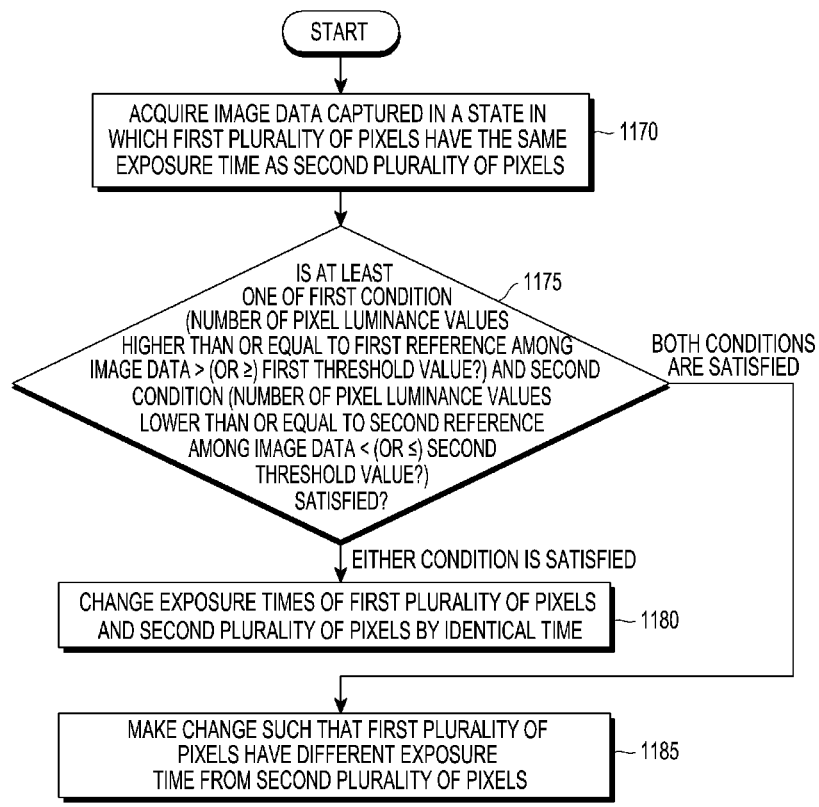
FIG. 11B is a flowchart illustrating a method of configuring exposure times of a first plurality of pixels and a second plurality of pixels according to an embodiment of the present disclosure.
Figure 13:
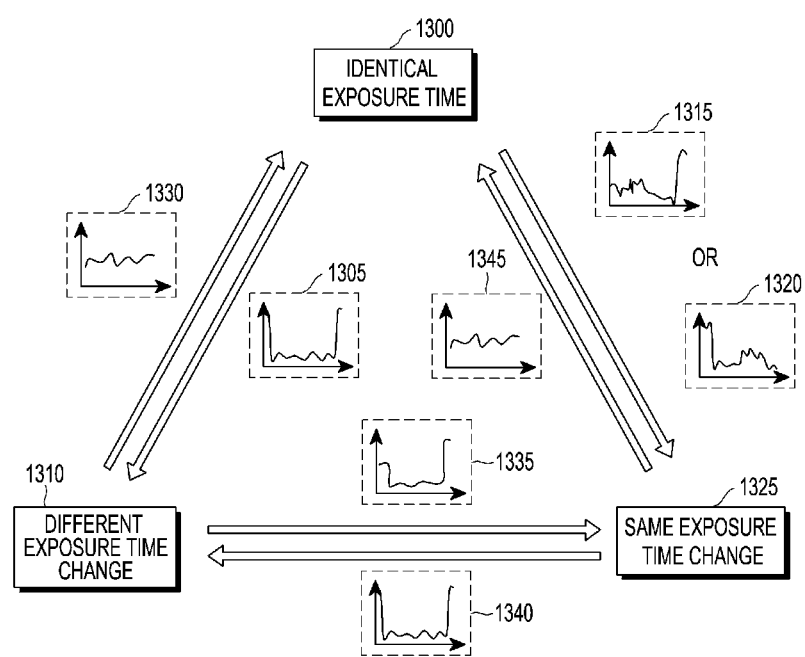
FIG. 13 is a view illustrating a method of adjusting an exposure time according to an embodiment of the present disclosure.

FIG. 11B is a flowchart illustrating a method of configuring exposure times of a first plurality of pixels and a second plurality of pixels according to an embodiment of the present disclosure, and FIG. 13 is a view illustrating a method of adjusting an exposure time according to an embodiment of the present disclosure.

Referring to FIGS. 11B and 13, a description will be given with reference to FIG. 13 in order to help with comprehension of operations illustrated in FIG. 11B. As shown in FIG. 11B, in operation 1170, an electronic device may acquire image data captured in a state in which a first plurality of pixels have the same exposure time as that of a second plurality of pixels. Thereafter, in operation 1175, a determination is made as to whether at least one of a first condition and a second condition is satisfied. Here, the first condition may represent whether the number of pixel luminance values higher than a first reference among the image data is larger than a first threshold value, and the second condition may represent whether the number of pixel luminance values lower than a second reference among the image data is smaller than a second threshold value.

When it is determined in operation 1175 that the first or second condition is satisfied, the electronic device may change the exposure times of the first plurality of pixels and the second plurality of pixels by an identical time, in operation 1180. On the contrary, when it is determined in operation 1175 that both the first condition and the second condition are satisfied, the electronic device may make a change such that the first plurality of pixels have an exposure time different from that of the second plurality of pixels, in operation 1185.

According to various embodiments of the present disclosure, when a ratio of a short exposure time to a long exposure time is larger than a threshold ratio, the electronic device, for example, a processor included in the electronic device may be configured to control the image sensor such that the first plurality of pixels are changed to have an exposure time different from that of the second plurality of pixels, in which the short exposure time is an exposure time corresponding to a degree to which the number of pixel luminance values higher than the selected first reference is larger than the first threshold value, and the long exposure time is an exposure time corresponding to a degree to which the number of pixel luminance values lower than the selected second reference is larger than the second threshold value.

Furthermore, according to various embodiments of the present disclosure, when the first plurality of pixels are changed to have the different exposure time from the second plurality of pixels, the processor may be configured to form an HDR image by performing at least one image processing of reconstruction and dynamic range compression based on first image data obtained from the first plurality of pixels and second image data obtained from the second plurality of pixels.

If the ratio of the exposure times of the plurality of pixels having the different exposure times does not exceed the threshold ratio, the electronic device may operate in the auto-exposure mode in which the first plurality of pixels have the same exposure time as that of the second plurality of pixels. The image processing such as the reconstruction and the dynamic range compression may be omitted in the auto-exposure mode.

Referring to FIG. 13, a state 1300 in which an exposure time of a first plurality of pixels is identical to that of a second plurality of pixels may be changed to a state 1310 in which the exposure time of the first plurality of pixels is different from that of the second plurality of pixels or a state 1325 in which the exposure times of the first plurality of pixels and the second plurality of pixels are changed by an identical time. The state change may be made based on a histogram on the basis of image data of the first plurality of pixels and the second plurality of pixels.

For example, if a histogram 1305 including both an over-exposed region and an under-exposed region is created based on the image data of the first plurality of pixels and the second plurality of pixels in the state 1300 in which the exposure times are identical to each other, the state 1300 may be changed to the state 1310 in which the exposure times are different from each other. Furthermore, if a histogram 1315 including an over-exposed region or a histogram 1320 including an under-exposed region is created in the state 1300 in which the exposure times are identical to each other, the state 1300 may be changed to the state 1325 in which the exposure times are changed.

On the contrary, if a histogram 1330 having uniformly distributed pixel values is created based on the image data of the first plurality of pixels and the second plurality of pixels in the state 1310 in which the exposure times are different from each other, a return may be made to the state 1300 in which the exposure times are identical to each other. However, if a histogram 1335 including both an over-exposed region and an under-exposed region is created based on the image data of the first plurality of pixels and the second plurality of pixels in the state 1310 in which the exposure times are different from each other, a change may be made to the state 1325 in which the currently different exposure times are changed by an identical time. If a histogram 1345 created in the state 1325 has a uniform distribution, a change may be made to the state 1300 in which the exposure times of the first plurality of pixels and the second plurality of pixels are identically configured.

Figure 14:
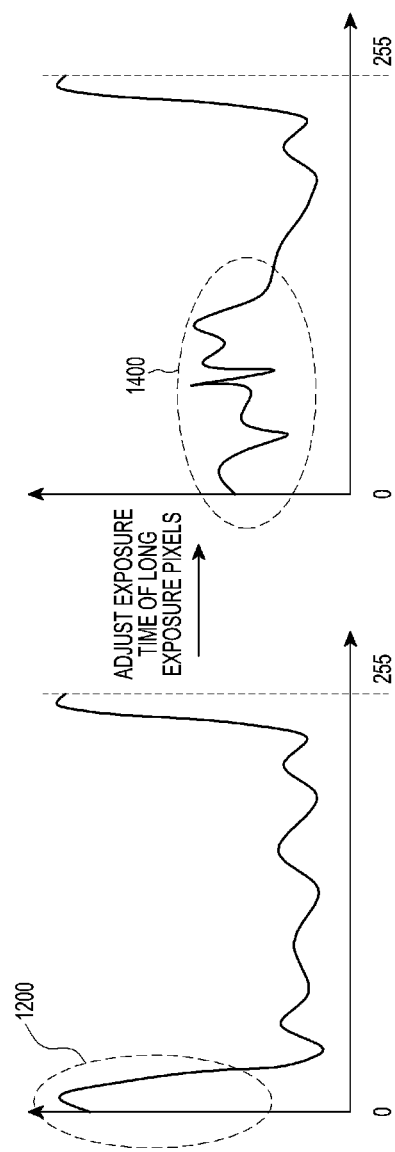
FIG. 14 illustrates an example of a histogram change depending on an adjustment of a long exposure time according to an embodiment of the present disclosure.

FIG. 14 illustrates an example of a histogram change depending on an adjustment of a long exposure time according to an embodiment of the present disclosure.

Referring to FIG. 14, for example, if an amount of exposure of a first group of pixels of the image sensor 10, namely, an amount of exposure of long exposure pixels is adjusted to correspond to an under-exposed region, the under-exposed portion 1200 may be changed to have a relatively uniform luminance value distribution 1400 as illustrated in FIG. 14.

Figure 15:
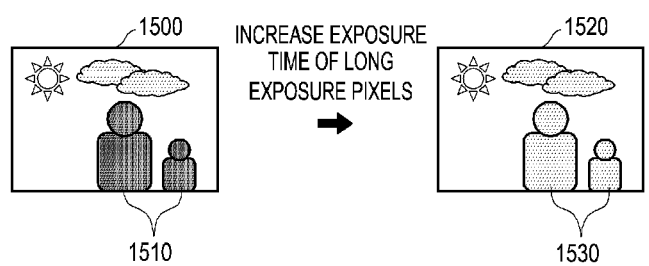
FIG. 15 illustrates an example of an image change depending on an adjustment of a long exposure time according to an embodiment of the present disclosure.

FIG. 15 illustrates an example of an image change depending on an adjustment of a long exposure time according to an embodiment of the present disclosure.

Referring to FIG. 15, here, it is assumed that an image 1500, prior to an adjustment of an exposure time, is an image captured in an auto-exposure mode in which an exposure time of a first group of pixels is identical to that of a second group of pixels, and an image 1520, after the adjustment of the exposure time, is a long exposure image captured in an HDR mode.

As shown in FIG. 15, when a light source is behind a subject 1510 in the image 1500 prior to the adjustment of the exposure time, the subject 1510 appears darker than it really is on account of under-exposure. However, after the exposure time for the long exposure pixels is increased, a long exposure of the image 1520 may be obtained in which luminance of a subject 1530 has been corrected. As described above, the exposure time is configured to be longer than the general exposure by adjusting the exposure time of the long exposure pixels, thereby obtaining the image in which the under-exposed region is alleviated.

Figure 16:
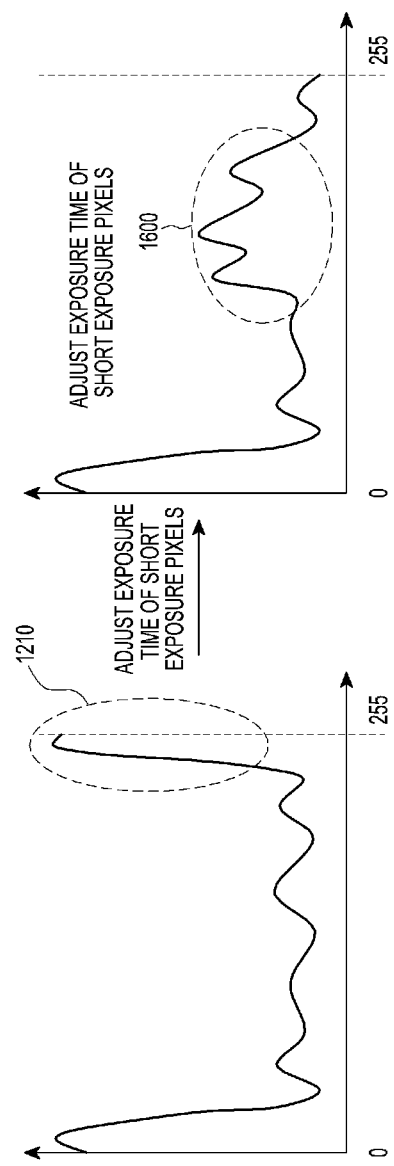
FIG. 16 illustrates an example of a histogram change depending on an adjustment of a short exposure time according to an embodiment of the present disclosure.

FIG. 16 illustrates an example of a histogram change depending on an adjustment of a short exposure time according to an embodiment of the present disclosure.

Referring to FIG. 16, if an amount of exposure of a second group of pixels of the image sensor 10, namely, an amount of exposure of short exposure pixels is adjusted to correspond to an over-exposed region, an over-exposed region 1210 may be changed to have a relatively uniform luminance value distribution 1600 as illustrated in FIG. 16. Such a change will be described below with reference to FIG. 17.

Figure 17:
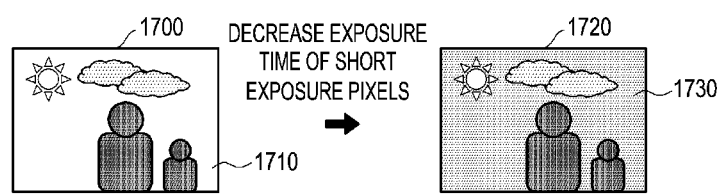
FIG. 17 illustrates an example of an image change depending on an adjustment of a short exposure time according to an embodiment of the present disclosure.

FIG. 17 illustrates an example of an image change depending on an adjustment of a short exposure time according to an embodiment of the present disclosure.

Referring to FIG. 17, in an image 1700, prior to an adjustment of an exposure time, a background portion 1710 appears much brighter than it really is, on account of an over-exposure. However, after the exposure time for the short exposure pixels is decreased, a short exposure image 1720 may be obtained in which luminance of a background 1730 has been corrected as compared with the image 1700 prior to the adjustment of the exposure timed. As described above, the exposure time is configured to be shorter than the general exposure by adjusting the exposure time of the short exposure pixels, thereby obtaining the image in which the over-exposed region is alleviated.

Meanwhile, in FIG. 12, when the backlight is recognized in the auto-exposure mode, the HDR mode is triggered. However, in a case where the backlight disappears in the HDR mode, it is desirable that a return be made to the auto-exposure mode by releasing the HDR mode. In switching from the live HDR mode according to the various embodiments of the present disclosure to the auto-exposure mode, a process of controlling the image sensor will be described below with reference to FIG. 18.

Figure 18:
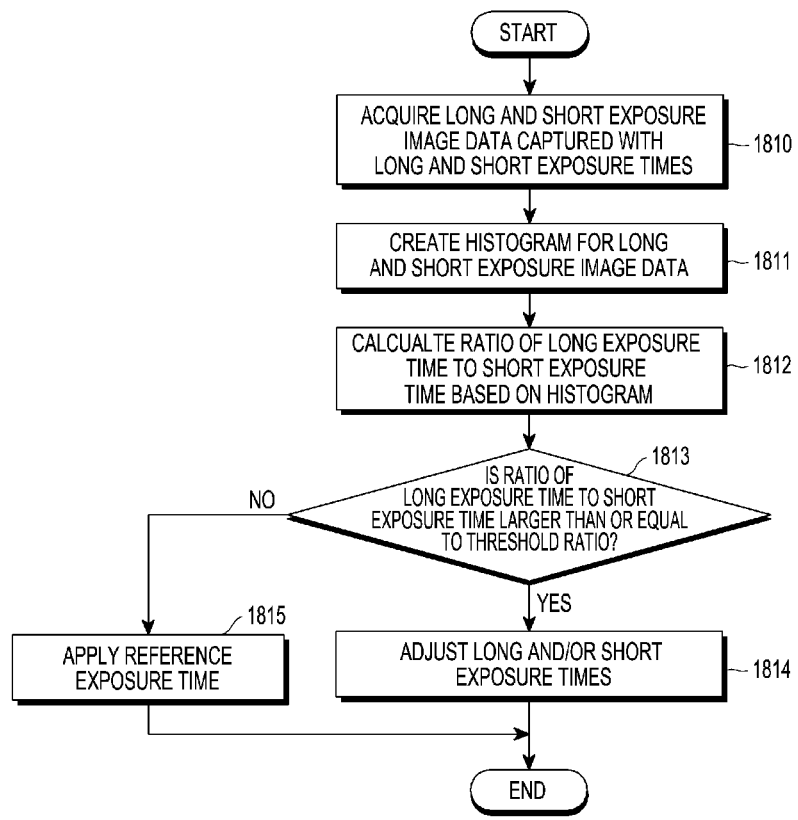
FIG. 18 is a flowchart illustrating a method of controlling an image sensor when a live HDR mode is switched to an auto-exposure mode according to an embodiment of the present disclosure.

FIG. 18 is a flowchart illustrating a method of controlling an image sensor when a live HDR mode is switched to an auto-exposure mode according to an embodiment of the present disclosure.

Referring to FIG. 18, an electronic device may acquire long exposure image data captured with a long exposure time and short exposure image data captured with a short exposure time in operation 1810, and may create a histogram for the long and short exposure image data based on the respective image data in operation 1811. The electronic device may calculate a ratio of the long exposure time to the short exposure time based on the histogram in operation 1812, and may determine whether the ratio of the long exposure time to the short exposure time is larger than a threshold ratio in operation 1813. If the ratio is larger than or equal to the threshold ratio, the electronic device may adjust the long exposure time and/or the short exposure time in operation 1814, and if the ratio is not larger than the threshold ratio, the electronic device may apply a reference exposure time in operation 1815.

In another embodiment of the present disclosure, a third threshold ratio may also be defined according to the purpose for capturing the image. For example, in a case where it is needed to capture an image for Optical Character Recognition (OCR), even though text detection is desired in some regions of the image, an entrance to the HDR mode may not be made if a ratio of a short exposure time to a long exposure time of the image is smaller than or equal to a first threshold ratio. In this case, the text may be detected and recognized by applying the third threshold ratio smaller than a reference threshold ratio.

In another embodiment of the present disclosure, a histogram may be analyzed by using a plurality of image sensors. For example, first short and long exposure times and second short and long exposure times may be calculated based on image data output from first and second image sensors. Here, a ratio of the first short exposure time to the first long exposure time and a ratio of the second short exposure time to the second long exposure time are compared with a threshold ratio, and an operation of an HDR mode may be adjusted depending on the result of the comparison. For example, in a case where switching between the HDR mode and the auto-exposure mode is frequently made depending on a change of lighting, in order to prevent blinking of an image displayed on a screen, operations may be performed in the HDR mode only when both the ratio of the first short exposure time to the first long exposure time and the ratio of the second short exposure time to the second long exposure time exceeds the threshold ratio.

In another embodiment of the present disclosure, an HDR mode using a plurality of image sensors may be applied. For example, an HDR image may be provided and or generated by composing images based on pixel values of short exposure pixels of a first image sensor and long exposure pixels of a second image sensor.

Figure 19:
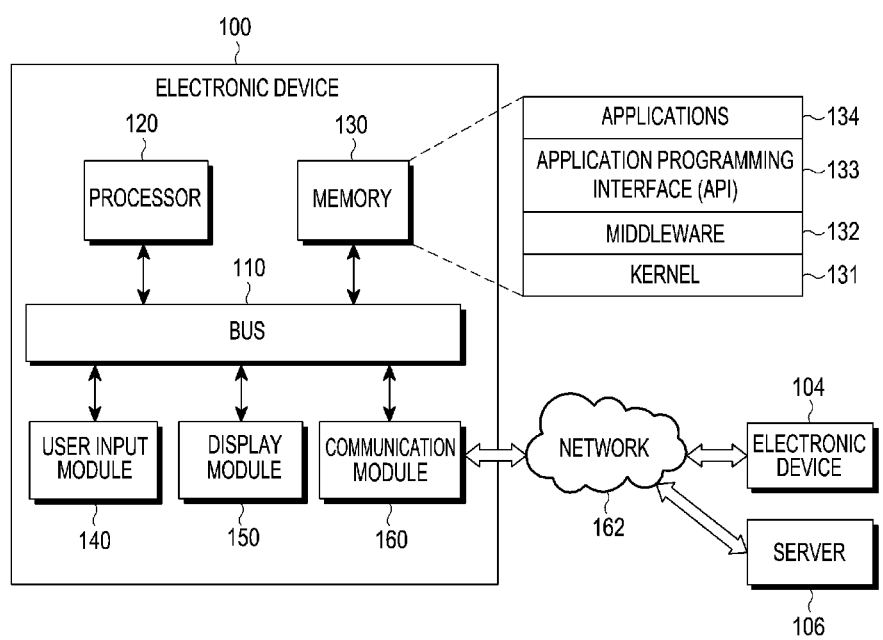
FIG. 19 is a block diagram of an electronic device according to an embodiment of the present disclosure.

FIG. 19 is a block diagram of an electronic device according to an embodiment of the present disclosure.

Referring to FIG. 19, an electronic device 100 may include a bus 110, a processor 120, a memory 130, a user input module 140, a display module 150, and a communication module 160.

The bus 110 may be a circuit connecting the aforementioned elements and transferring communication, e.g., a control message, between the aforementioned elements.

For example, the processor 120 may receive instructions from the aforementioned other elements, e.g., the memory 130, the user input module 140, the display module 150, and the communication module 160, through the bus 110, decipher the received instructions, and perform calculation or data processing according to the deciphered instructions.

The memory 130 may store instructions and/or data which is received from the processor 120 and/or other elements, e.g., the user input module 140, the display module 150, and the communication module 160, and/or created by the processor 120 and/or other elements. The memory 130 may include programming modules, such as a kernel 131, a middleware 132, an Application Programming Interface (API) 133, applications 134, and the like. Each of the programming modules described above may be configured with software, firmware, hardware, and/or combinations of two or more thereof.

The kernel 131 may control and/or manage system resources, e.g., the bus 110, the processor 120, the memory 130, and the like, used to perform operations and/or functions implemented in the remaining programming modules, for example, the middleware 132, the API 133, and the applications 134. Furthermore, the kernel 131 may provide an interface through which the middleware 132, the API 133, and the applications 134 may access individual elements of the electronic device 100 to control and/or manage them.

The middleware 132 may serve as an intermediary such that the API 133 and the applications 134 communicate with the kernel 131 to transmit/receive data. Furthermore, in regard to task requests received from the plurality of applications 134, the middleware 132 may perform load balancing for the task requests by using, for example, a method of assigning a priority for using the system resources, e.g., the bus 110, the processor 120, and the memory 130, of the electronic device 100 to at least one of the applications 134.

The API 133 is an interface through which the applications 134 may control functions provided by the kernel 131 and the middleware 132, and may include at least one interface and/or function for file control, window control, image processing, and/or text control.

The user input module 140, for example, may receive instructions and/or data from a user, and may transfer the received instructions and/or data to the processor 120 and/or the memory 130 through the bus 110. The display module 150 may display images and/or data to a user.

The communication module 160 may connect communication between another electronic device 104 and the electronic device 100 and/or between a server 106 and the electronic device 100. The communication module 160 may support a short range communication protocol, e.g., Wireless Fidelity (Wi-Fi)), BlueTooth (BT), and/or Near Field Communication (NFC), or may use a network 162, e.g., the Internet, a Local Area Network (LAN), a Wire Area Network (WAN), a telecommunication network, a cellular network, a satellite network or a Plain Old Telephone Service (POTS), for communication. The other electronic device 104 may be a same device, e.g., a same type of device, as the electronic device 100 or a different device, e.g., a different type of device, from the electronic device 100.

Figure 20:
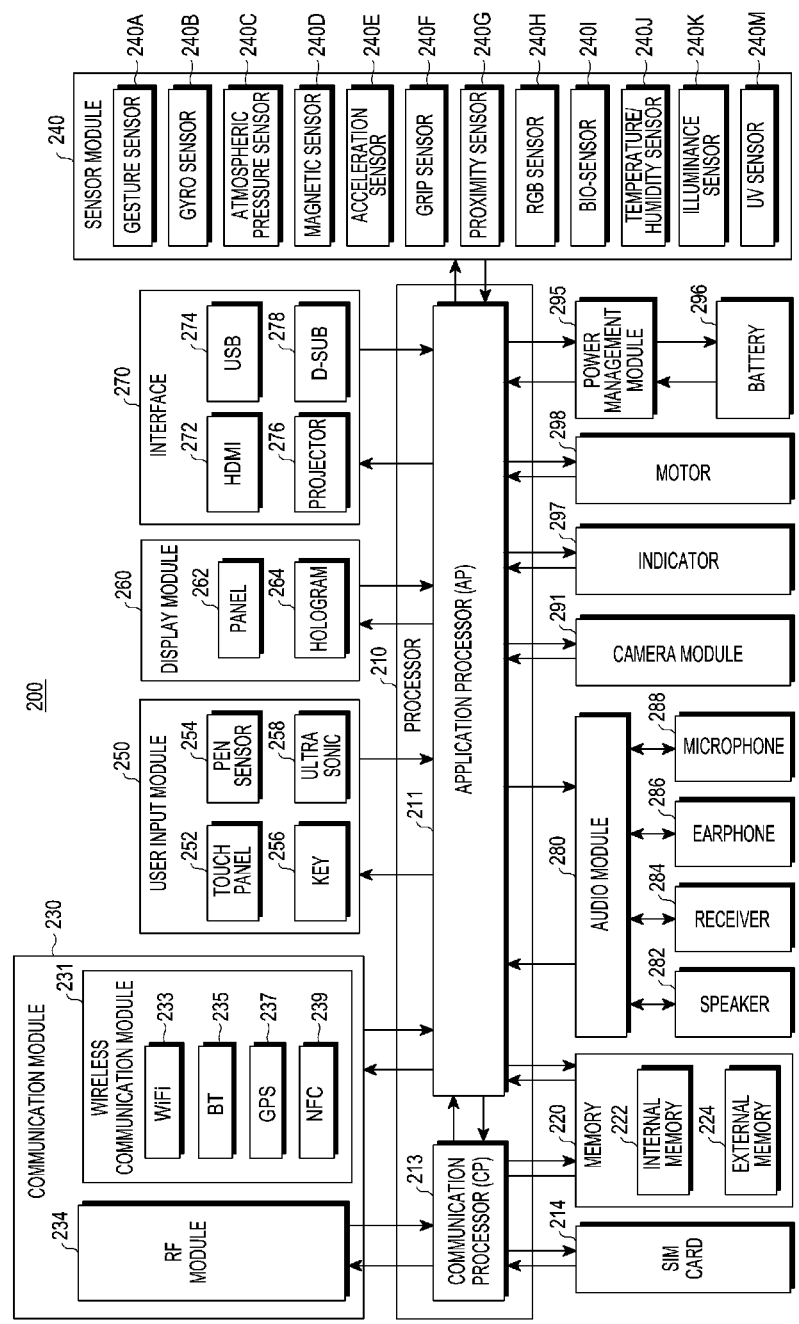
FIG. 20 is a block diagram of hardware according to an embodiment of the present disclosure.

FIG. 20 is a block diagram of hardware according to an embodiment of the present disclosure.

Referring to FIG. 20, hardware 200 may be, for example, the electronic device 100 illustrated in FIG. 19. As shown in FIG. 20, the hardware 200 may include at least one processor 210, which may be referred to as a processor 210, a Subscriber Identification Module (SIM) card 214, a memory 220, a communication module 230, a sensor module 240, a user input module 250, a display module 260, an interface 270, an audio module 280, a camera module 291, a power management module 295, a battery 296, an indicator 297, and a motor 298.

The processor 210, which may be similar to the processor 120, may include at least one AP 211 and/or at least one Communication Processor (CP) 213. The processor 210 may be, for example, the processor 120 illustrated in FIG. 19. Although the AP 211 and the CP 213 are included in the processor 210 in FIG. 20, and the AP 211 and the CP 213 may be included in different Integrated Circuit (IC) packages, respectively. In an embodiment, the AP 211 and the CP 213 may be included in one IC package.

The AP 211 may control a plurality of hardware and/or software elements connected thereto by driving an operating system or an application program, and may perform processing and calculation of various pieces of data including multimedia data. The AP 211 may be implemented as, for example, a System on Chip (SoC). According to an embodiment, the processor 210 may further include a Graphic Processing Unit (GPU) (not illustrated).

The CP 213 may perform a function of managing data links and converting communication protocols in communication between an electronic device, e.g., the electronic device 100, including the hardware 200 and other electronic devices connected with the electronic device through a network. The CP 213 may be implemented as, for example, a Soc. According to an embodiment, the CP 213 may perform at least some of multimedia control functions. The CP 213 may distinguish and authenticate the electronic devices in a communication network by using, for example, a subscriber identification module, such as the SIM card 214. Furthermore, the CP 213 may provide a user with services such as a voice call service, a video call service, a text message service, and packet data service.

Moreover, the CP 213 may control data transmission/reception of the communication module 230. Although the elements such as the CP 213, the power management unit 295, and the memory 220 are illustrated separately from the AP 211 in FIG. 20, the AP 211 may be implemented to include at least some of the aforementioned elements, e.g., the CP 213, according to an embodiment.

According to an embodiment, the AP 211 and/or the CP 213 may load instructions and/or data received from at least one of a non-volatile memory or other elements connected thereto in a volatile memory and may process the same. In addition, the AP 211 or the CP 213 may store data received from and/or created by at least one of other elements in the non-volatile memory.

The SIM card 214 may be a card embodying a subscriber identification module, and may be inserted into a slot formed at a specific position of the electronic device. The SIM card 214 may include unique identification information, e.g., an Integrated Circuit Card Identifier (ICCD), or subscriber information, e.g., an International Mobile Subscriber Identity (IMSI).

The memory 220 may include an internal memory 222 and/or an external memory 224. The memory 220 may be, for example, the memory 130 illustrated in FIG. 19. The internal memory 222 may include at least one of a volatile memory, e.g., a Dynamic Random Access Memory (DRAM), a Static RAM (SRAM), a Synchronous Dynamic RAM (SDRAM), or the like, and/or a non-volatile memory, e.g., a Read Only Memory (ROM), a One Time Programmable ROM (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like. According to an embodiment, the internal memory 222 may have a form of a Solid State Drive (SSD). The external memory 224 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like.

The communication module 230 may include a wireless communication module 231 and/or a Radio Frequency (RF) module 234. The communication module 230 may be, for example, the communication module 160 illustrated in FIG. 19. The wireless communication module 230 may include, for example, a Wi-Fi module 233, a BT module 235, a GPS 237, and/or a NFC module 239. For example, the wireless communication module 231 may provide a wireless communication function using a wireless frequency. Additionally or alternatively, the wireless communication module 231 may include a network interface (not shown), such as a LAN card, and/or a modem (not shown) for connecting the hardware 200 with a network, such as the network 162 of FIG. 19, e.g., the Internet, a LAN, a WAN, a telecommunication network, a cellular network, a satellite network, a POTS, or the like.

The RF module 234 serves to perform data transmission/reception, for example, transmission/reception of an RF signal and/or a paged electronic signal. Although not illustrated, the RF module 234 may include, for example, a transceiver, a Power Amplifier Module (PAM), a frequency filter, a Low Noise Amplifier (LNA), and/or the like. Furthermore, the RF module 234 may further include a component for transmitting/receiving an electromagnetic wave in a free space in wireless communication, for example, a conductor, a conductive wire, or the like.

The sensor module 240 may include, for example, at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red/Green/Blue (RGB) sensor 240H, a bio-sensor 240I, a temperature/humidity sensor 240J, an illuminance sensor 240K, and an Ultra Violet (UV) sensor 240M. The sensor module 240 measures a physical quantity and/or senses an operation state of the electronic device, and may convert the measured or sensed information into an electric signal. Additionally, the sensor module 240 may include, for example, an E-nose sensor (not illustrated), an ElectroMyoGraphy (EMG) sensor (not illustrated), an ElectroEncephaloGram (EEG) sensor (not illustrated), an ElectroCardioGram (ECG) sensor (not illustrated), a fingerprint sensor, or the like. The sensor module 240 may further include a control circuit for controlling one or more sensors included therein.

The user input module 250 may include a touch panel 252, a pen sensor 254, a key 256, and/or an ultrasonic input device 258. The user input module 250 may be, for example, the user input module 140 illustrated in FIG. 19. The touch panel 252 may recognize a touch input through at least one of, for example, a capacitive type, a resistive type, an infrared type, and an acoustic wave type of touch panel. Further, the touch panel 252 may also further include a controller (not illustrated). In the case of the capacitive type, proximity recognition as well as a direct touch is possible. The touch panel 252 may also further include a tactile layer. In this case, the touch panel 252 may provide a tactile response to a user.

The pen sensor 254 may be implemented, for example, using a method identical and/or similar to receiving a user's touch input and/or using a separate recognition sheet. For example, a keypad or a touch key may be used as the key 256. The ultrasonic input device 258 is a device that may identify data by detecting a sound wave from the electronic device to a microphone, e.g., a microphone 288, through a pen generating an ultrasonic wave signal, and wireless recognition is possible therethrough. According to an embodiment, the hardware 200 may also receive a user input from an external device, e.g., a network, a computer, and/or a server, connected with the communication module 230, using the communication module 230.

The display module 260 may include a panel 262 and/or a hologram 264. The display module 260 may be, for example, the display module 150 illustrated in FIG. 19. For example, the panel 262 may be a Liquid Crystal Display (LCD), an Active Matrix Organic Light Emitting Diode (AM-OLED), or any suitable and/or similar type of display device. The panel 262 may be implemented to be, for example, flexible, transparent, and/or wearable. The panel 262 may also be configured as one module together with the touch panel 252. The hologram 264 may show a three dimensional image in the air, using an interference of light. According to an embodiment, the display module 260 may further include a control circuit for controlling the panel 262 and/or the hologram 264.

The interface 270 may include, for example, a High-Definition Multimedia Interface (HDMI) 272, a Universal Serial Bus (USB) 274, a projector 276, or a D-subminiature (D-sub) 278. Additionally or alternatively, the interface 270 may include, for example, a Secure Digital (SD)/Multi-Media Card (MMC) (not illustrated) and/or Infrared Data Association (IrDA) device (not illustrated).

The audio module 280 may bilaterally convert between a voice and an electrical signal. The audio module 280 may convert voice information input and/or output through, for example, a speaker 282, a receiver 284, an earphone 286, and/or the microphone 288.

The camera unit 291 may photograph a still image and a moving image, and according to an embodiment, may include one or more image sensors, e.g., a front lens and/or a rear lens (not illustrated), an Image Signal Processor (ISP) (not illustrated), and/or flash LED (not illustrated).

The power management unit 295 may manage power of the hardware 200. Although not illustrated, the power management module 295 may include, for example, a Power Management Integrated Circuit (PMIC), a charger IC, and/or a battery fuel gauge.

The PMIC may be mounted in, for example, an IC and/or an SoC semiconductor. Charging methods may be classified into a wired charging method and a wireless charging method. The charger IC may charge a battery, and may prevent introduction of over-voltage and/or over-current from a charger. According to an embodiment, the charger IC may include a charger IC for at least one of the wired charging method and the wireless charging method. A magnetic resonance scheme, a magnetic induction scheme, and/or an electromagnetic wave scheme may be exemplified as the wireless charging method, and an additional circuit for wireless charging, such as a coil loop circuit, a resonance circuit, a rectifier circuit, and the like may be added.

The battery fuel gauge may measure, for example, a residual quantity of the battery 296, and a voltage, a current, and/or a temperature while charging. The battery 296 may generate electricity to supply power, and may be, for example, a rechargeable battery.

The indicator 297 may display a particular state, for example, a booting state, a message state, and/or a charging state of the hardware 200 and/or some of the hardware 200, e.g., the AP 211. The motor 298 may convert an electrical signal into a mechanical vibration.

Although not illustrated, the hardware 200 may include a processing unit, e.g., a GPU, for mobile TV support. The processing unit for the mobile TV support may process media data according to a standard of Digital Multimedia Broadcasting (DMB), Digital Video Broadcasting (DVB), media flow, or the like.

Each of the aforementioned elements of the hardware according to an embodiment of the present disclosure may be configured with one or more components, and names of the elements may vary depending on a type of the electronic device. The hardware according to the present disclosure may include at least one of the aforementioned elements or may further include other additional elements, and/or some of the aforementioned elements may be omitted. Furthermore, some of the elements of the hardware according to an embodiment of the present disclosure may be combined into one entity, which may perform the same functions as those of the elements before the combination.

The term "module" used in the present disclosure may refer to, for example, a unit including one or more combinations of hardware, software, and firmware. The "module" may be interchangeably used with a term, such as unit, logic, logical block, component, or circuit. The "module" may be a minimum unit or a part of the integrally formed component. The "module" may be a minimum unit performing one or more functions or a part thereof. The "module" may be mechanically and/or electronically implemented. For example, the "module" according to the present disclosure may include at least one of an Application-Specific Integrated Circuit (ASIC) chip, a Field-Programmable Gate Arrays (FPGAs), and a programmable-logic device for performing operations which are known and/or are to be developed hereinafter.

Figure 21:
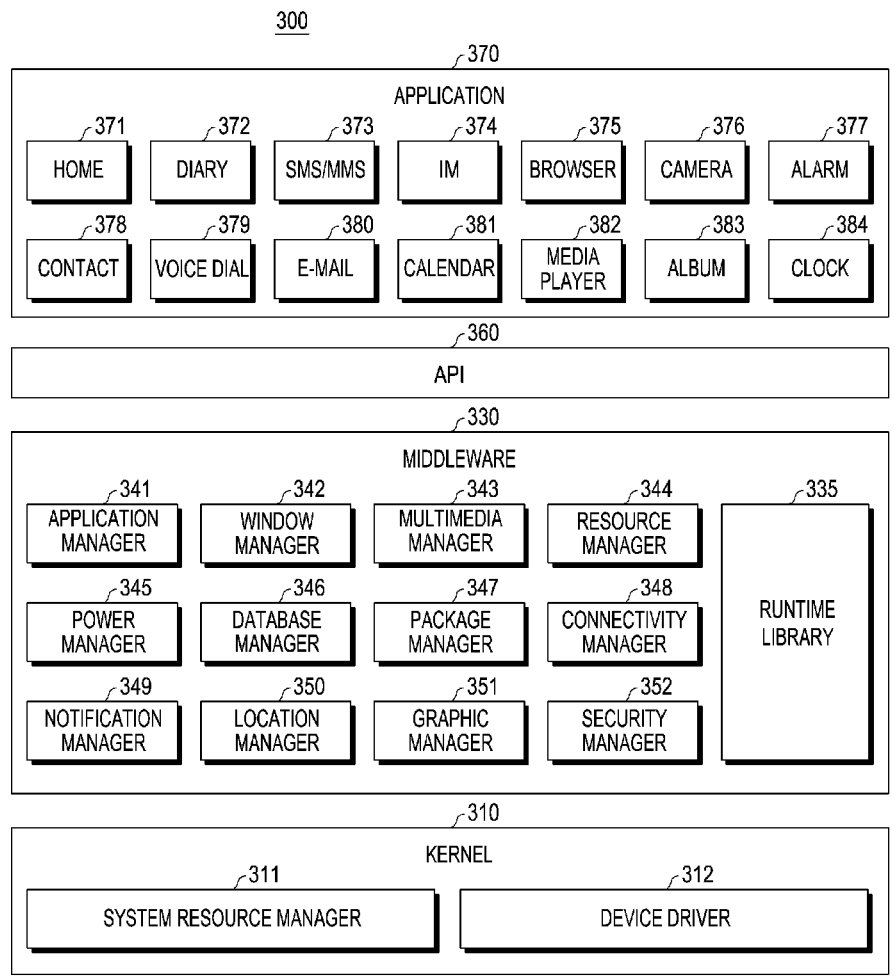
FIG. 21 is a block diagram of a programming module according to an embodiment of the present disclosure.

FIG. 21 is a block diagram of a programming module according to an embodiment of the present disclosure.

Referring to FIG. 21, a programming module 300 may be included, e.g., stored, in the electronic device 100, for example, in the memory 130 illustrated in FIG. 19. At least a part of the programming module 300 may be configured with software, firmware, hardware, and/or combinations of two or more thereof. The programming module 300 may include an operating system that is implemented in hardware, e.g., the hardware 200, to control resources related to an electronic device, e.g., the electronic device 100, and/or various applications, e.g., applications 370, driven on the operating system. For example, the operating system may be Android, iOS, Windows, Symbian, Tizen, Bada, or the like. Referring to FIG. 21, the programming module 300 may include a kernel 310, a middleware 330, an API 360, and applications 370.

The kernel 310, which may be similar to the kernel 131, may include a system resource manager 311 and/or a device driver 312. The system resource manager 311 may include, for example, although not illustrated, a process managing unit, a memory managing unit, and/or a file system managing unit. The system resource manager 311 may perform control, allocation, and/or collection of system resources. The device driver 312 may include, for example, although not illustrated, a display driver, a camera driver, a Bluetooth driver, a shared memory driver, a USB driver, a keypad driver, a Wi-Fi driver, and/or an audio driver. Furthermore, according to one embodiment, the device driver 312 may include an Inter-Process Communication (IPC) driver (not illustrated).

The middleware 330 may include a plurality of modules implemented in advance to provide functions which the applications 370 commonly need. Furthermore, the middleware 330 may provide functions through the API 360 such that the applications 370 may efficiently use restricted system resources within the electronic device. For example, as illustrated in FIG. 21, the middleware 330, which may be similar to the middleware 132, may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and/or a security manager 352.

The runtime library 335 may include a library module (not illustrated) used by a compiler in order to add a new function through a programming language while the applications 370 are being executed. According to an embodiment, the runtime library 335 may perform an input/output function, a memory management function, and/or a function for an arithmetic function.

For example, the application manager 341 may manage a life cycle of at least one of the applications 370. The window manager 342 may manage Graphical User Interface (GUI) resources used by a screen. The multimedia manager 343 may discern formats needed for reproduction of various media files, and may perform encoding and/or decoding of the media file by using a codec suitable for the corresponding format. The resource manager 344 may manage resources such as a source code, a memory, and a storage space of at least one of the applications 370.

The power manager 345 may manage a battery and/or power while operating together with a Basic Input/Output System (BIOS), and may provide power information needed for operations. The database manager 346 may manage generation, search, and/or change of a database to be used by at least one of the applications 370. The package manager 347 may manage installation and/or an update of an application distributed in a form of a package file.

For example, the connectivity manager 348 may manage wireless connectivity such as Wi-Fi and/or Bluetooth. The notification manager 349 may display and/or notify of an event such as an arrival message, promise, proximity notification, and the like in such a way that a user is not disturbed. The location manager 350 may manage location information of the electronic device. The graphic manager 351 may manage a graphic effect which will be provided to a user and a user interface related to the graphic effect. The security manager 352 may provide all security functions required for system security or user authentication. According to an embodiment, in a case where the electronic device, e.g., the electronic device 100, has a telephone call function, the middleware 330 may further include a telephony manager (not illustrated) for managing a voice or video call function of the electronic device.

The middleware 330 may generate and use a new middleware module through various functional combinations of the aforementioned internal element modules. The middleware 330 may provide modules specialized according to types of operating systems in order to provide differentiated functions. Furthermore, the middleware 330 may dynamically remove some of the existing elements and/or add new elements. Accordingly, the middleware 330 may exclude some of the elements described in the various embodiments of the present disclosure, further include other elements, and/or substitute the elements with elements having a different name and performing a similar function.

The API 360, e.g., the API 133, is a set of API programming functions, and may be provided with a different configuration according to an operating system. For example, in a case of Android or iOS, one API set may be provided for each of platforms, and in a case of Tizen, two or more API sets may be provided.

The applications 370, which may be similar to the applications 134, may include, for example, a preloaded application and/or a third party application, which may include a home application 371, a diary application 372, an SMS/MMS application 373, an IM application 374, a browser application 375, a camera application 376, an alarm application 377, a contact application 378, a voice dial application 379, an e-mail application 380, a calendar application 381, a media player application 382, an album application 383, a clock application 384, and any other similar and/or suitable applications.

At least a part of the programming module 300 may be implemented with instructions stored in computer-readable storage media. When the instructions are executed by at least one processor, e.g., the processor 210, the at least one processor may perform functions corresponding to the instructions. The computer readable storage medium may be, for example, the memory 260. At least a part of the programming module 300 may be implemented, e.g., executed, by, for example, the processor 210. At least a part of the programming module 300 may include, for example, a module, a program, a routine, a set of instructions, and/or a process for performing one or more functions.

Names of the elements of the programming module, e.g., the programming module 300, according to an embodiment of the present disclosure may vary depending on a type of the operation system. The programming module according to an embodiment of the present disclosure may include one or more of the aforementioned elements and/or may further include other additional elements, and/or some of the aforementioned elements may be omitted. The operations performed by a programming module and/or other elements according to an embodiment of the present disclosure may be processed through a sequential, parallel, repetitive, and/or heuristic method, and some of the operations may be omitted and/or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic device comprising:
an image sensor configured to acquire image data from an array of pixels included in the image sensor; and
at least one processor configured to process the image data,
wherein the array of pixels comprises:
a first plurality of pixels configured to have a first identical exposure time; and
a second plurality of pixels configured to have a second identical exposure time,
wherein the first identical exposure time is identical to or different from the second identical exposure time, and
wherein the at least one processor is configured to control the image sensor such that the first plurality of pixels are changed from at least one of a state of having the exposure time identical to that of the second plurality of pixels to a state of having the exposure time different from that of the second plurality of pixels, and a state of having the exposure time different from that of the second plurality of pixels to a state of having the exposure time identical to that of the second plurality of pixels, based on at least some of the image data.

2. The electronic device of claim 1, wherein the at least one processor is further configured to control the image sensor based on at least some of pixel luminance values contained in the image data.

3. The electronic device of claim 2, wherein the at least one processor is further configured to control the image sensor to change the first plurality of pixels from the state of having the exposure time identical to that of the second plurality of pixels to the state of having the exposure time different from that of the second plurality of pixels, at least partially based on whether the number of pixel luminance values higher than a selected first reference, from among the image data, is larger than a first threshold value.

4. The electronic device of claim 3, wherein the at least one processor is further configured to control the image sensor to change the exposure time of the first plurality of pixels and the second plurality of pixels by an identical time, when the number of pixel luminance values lower than a selected second reference, from among the image data, is smaller than a second threshold value.

5. The electronic device of claim 2, wherein the at least one processor is further configured to control the image sensor to change the first plurality of pixels from the state of having the exposure time identical to that of the second plurality of pixels to the state of having the exposure time different from that of the second plurality of pixels, when the number of pixel luminance values higher than a selected first reference, from among the image data, is larger than a first threshold value, and the number of pixel luminance values lower than a selected second reference, from among the image data, is larger than a second threshold value.

6. The electronic device of claim 5, wherein the at least one processor is further configured to control the image sensor to change the first plurality pixels to the state of having the exposure time different from that of the second plurality of pixels, when a ratio of an exposure time corresponding to a degree to which the number of pixel luminance values higher than the selected first reference, from among the image data, is larger than the first threshold value to an exposures time corresponding to a degree to which the number of pixel luminance values lower than the selected second reference, from among the image data, is larger than the second threshold value is larger than a threshold ratio.

7. The electronic device of claim 6, wherein the at least one processor is further configured to form a High Dynamic Range (HDR) image by performing at least one image processing of reconstruction and Dynamic Range Compression (DRC) based on first image data obtained from the first plurality of pixels and second image data obtained from the second plurality of pixels when the first plurality of pixels are changed to the state of having the exposure time different from that of the second plurality of pixels.

8. The electronic device of claim 3, wherein the at least one processor is further configured to process first image data obtained from the first plurality of pixels and second image data obtained from the second plurality of pixels while the first plurality of pixels have the exposure time different from that of the second plurality of pixels.

9. The electronic device of claim 8, wherein the at least one processor is further configured to adjust at least one of the exposure time of the first plurality of pixels and the exposure time of the second plurality of pixels, at least partially based on the first image data and the second image data.

10. The electronic device of claim 8, wherein the at least one processor is further configured to control the image sensor to change the first plurality of pixels to the state of having the exposure time identical to that of the second plurality of pixels, at least partially based on the first image data and/or the second image data.

11. The electronic device of claim 8, wherein the at least one processor is further configured to form a first image using pixel values contained in the first image data and to form a second image based on the second image data.

12. The electronic device of claim 11, wherein the at least one processor is further configured to form at least one of the first and second images using interpolation.

13. The electronic device of claim 11, wherein the at least one processor is further configured to form a third image by composing the first image and the second image.

14. The electronic device of claim 13, wherein the electronic device further comprises a display configured to display an image,
wherein the at least one processor is further configured to control the display to display the third image on the display.

15. The electronic device of claim 1, wherein the at least one processor comprises at least one of an application processor, an image processor, and an image pre-processor.

16. The electronic device of claim 1, wherein the first plurality of pixels and the second plurality of pixels are arranged according to a selected pattern in some regions of the array of pixels.

17. The electronic device of claim 1, wherein the array of pixels have a polygonal shape, and the first plurality of pixels and the second plurality of pixels are arranged such that at least two immediately adjacent pixels of the first plurality of pixels do not share one side of a polygon and at least two immediately adjacent pixels of the second plurality of pixels do not share one side of the polygon.

18. A method of controlling an operation of an electronic device, the method comprising:
acquiring image data using an image sensor comprising a first plurality of pixels configured to have a first identical exposure time and a second plurality of pixels configured to have a second identical exposure time,
wherein the acquiring of the image data comprises:
acquiring the image data using the first plurality of pixels and the second plurality of pixels while the first plurality of pixels have the first identical exposure time that is identical to the second identical exposure time of the second plurality of pixels; and
controlling the image sensor such that the first plurality of pixels have the first identical exposure time different from the second identical exposure time of the second plurality of pixels, at least partially based on a condition of the acquired image data.

19. The method of claim 18, wherein the acquiring of the image data further comprises:
controlling the image sensor to change the first plurality of pixels from a state of having the first identical exposure time different from the second identical exposure time of the second plurality of pixels to a state of having the first identical exposure time be identical to the second identical exposure time of the second plurality of pixels, based on at least some of pixel luminance values contained the acquired image data.

20. The method of claim 18, wherein the acquiring of the image data further comprises adjusting at least one of the first identical exposure time of the first plurality of pixels and the second identical exposure time of the second plurality of pixels based on at least some of pixel luminance values contained in the image data.

21. The method of claim 20, wherein the acquiring of the image data further comprises performing a control to change the first plurality of pixels from a state of having the first identical exposure time being identical to the second identical exposure time of the second plurality of pixels to a state having the first identical exposure time be different from the second identical exposure time of the second plurality of pixels, at least partially based on whether the number of pixel luminance values higher than a selected first reference, from among the image data, is larger than a first threshold value.

22. The method of claim 21, wherein the acquiring of the image data further comprises performing a control to change the first identical exposure time of the first plurality of pixels and the second identical exposure time of the second plurality of pixels by an identical time, when the number of pixel luminance values lower than a selected second reference, from among the image data, is smaller than a second threshold value.

23. The method of claim 20, wherein the acquiring of the image data further comprises performing a control to change the first plurality of pixels from a state of having the first identical exposure time being identical to the second identical exposure time of the second plurality of pixels to a state of having the first identical exposure time be different from the second identical exposure time of the second plurality of pixels, when the number of pixel luminance values higher than a selected first reference, from among the image data, is larger than a first threshold value, and the number of pixel luminance values lower than a selected second reference, from among the image data, is larger than a second threshold value.

24. The method of claim 23, wherein the acquiring of the image data further comprises performing a control to change the first plurality of pixels to the state of having the first identical exposure time being different from the second identical exposure time of the second plurality of pixels, when a ratio of an exposure time corresponding to a degree to which a number of pixel luminance values higher than the selected first reference, from among the image data, is larger than the first threshold value to an exposure time corresponding to a degree to which the number of pixel luminance values lower than the selected second reference, from among the image data, is larger than the second threshold value is larger than a threshold ratio.

25. The method of claim 24, further comprising forming a High Dynamic Range (HDR) image by performing at least one image processing of reconstruction and Dynamic Range Compression (DRC) based on first image data obtained from the first plurality of pixels and second image data obtained from the second plurality of pixels when the first plurality of pixels are changed to the state of having the first identical exposure time different from the second identical exposure time of the second plurality of pixels.

26. The method of claim 20, further comprising:
   forming a third image based on image data generated by the first plurality of pixels and the second plurality of pixels; and
   displaying the third image.

27. An electronic device for capturing an image, the electronic device comprising:
   an array of pixels;
   an image sensor configured to acquire image data from the array of pixels included in the image sensor, the array of pixels being configured to generate the image data using a first plurality of pixels configured to have a first identical exposure time and a second plurality of pixels configured to have a second identical exposure time, the first plurality of pixels and the second plurality of pixels being included in the array of pixels; and
   at least one processor configured to:
      process the image data,
      control the first identical exposure time and the second identical exposure time to be a same tune or a different time based on a condition of the image data, and
      generate an output image according to the image data.

28. The electronic device of claim 27, wherein the array of pixels are disposed so as to have a polygonal shape including the first plurality of pixels and the second plurality of pixels, and
   wherein at least two immediately adjacent pixels of the first plurality of pixels do not share one side of a polygon and at least two immediately adjacent pixels of the second plurality of pixels do not share one side of the polygon.

29. The electronic device of claim 27, wherein the controller is configured to determine pixels of the array of pixels respectively included in the first plurality of pixels and the second plurality of pixels according to a selected pattern of the array of pixels.

* * * * *